US012664503B2

(12) United States Patent
Yu

(10) Patent No.: US 12,664,503 B2
(45) Date of Patent: Jun. 23, 2026

(54) DATA PROCESSING METHOD, COMPUTER DEVICE, AND READABLE STORAGE MEDIUM

(71) Applicant: Tencent Cloud Computing (Beijing) Co., Ltd., Beijing (CN)

(72) Inventor: Yi Yu, Beijing (CN)

(73) Assignee: Tencent Cloud Computing (Beijing) Co., Ltd., Beijing (CN)

( * ) Notice: Subject to any disclaimer, the term of this patent is extended or adjusted under 35 U.S.C. 154(b) by 348 days.

(21) Appl. No.: 18/320,313

(22) Filed: May 19, 2023

(65) Prior Publication Data

US 2023/0289828 A1 Sep. 14, 2023

Related U.S. Application Data

(63) Continuation of application No. PCT/CN2021/107114, filed on Jul. 19, 2021.

(30) Foreign Application Priority Data

Jun. 3, 2021 (CN) .......................... 202110622162.9

(51) Int. Cl.
*G06Q 10/0635* (2023.01)
*G06Q 30/018* (2023.01)

(52) U.S. Cl.
CPC ..... *G06Q 30/0185* (2013.01); *G06Q 10/0635* (2013.01)

(58) Field of Classification Search
None
See application file for complete search history.

(56) References Cited

U.S. PATENT DOCUMENTS

2016/0057159 A1* 2/2016 Yin ....................... H04L 63/145
726/23
2018/0083994 A1 3/2018 Armstrong et al.

FOREIGN PATENT DOCUMENTS

| CN | 108109011 A | 6/2018 | |
| CN | 110852761 A | 2/2020 | |
| CN | 110852881 A | 2/2020 | |
| CN | 110889546 A * | 3/2020 | ............. G06N 3/044 |
| CN | 112488765 A | 3/2021 | |
| WO | WO-2020052168 A1 * | 3/2020 | ............. G06Q 40/08 |

OTHER PUBLICATIONS

The World Intellectual Property Organization (WIPO) International Search Report for PCT/CN2021/107114 Jan. 28, 2022 12 Pages (including translation).

* cited by examiner

*Primary Examiner* — Mehmet Yesildag
(74) *Attorney, Agent, or Firm* — Anova Law Group, PLLC

(57) ABSTRACT

A data processing method includes: receiving a first service request initiated by a target account, an associated account corresponding to the target account initiating a second service request; constructing a homogeneous graph and a heterogeneous graph according to attribute data; performing community discovery processing on the homogeneous graph to obtain an attribute label of the first service request; performing node sequence sampling on the homogeneous graph and the heterogeneous graph to obtain a graph association feature vector corresponding to the first service request; and performing risk prediction based on the attribute label, the graph association feature vector and a behavior feature corresponding to the first attribute data, to obtain a risk prediction result.

20 Claims, 9 Drawing Sheets

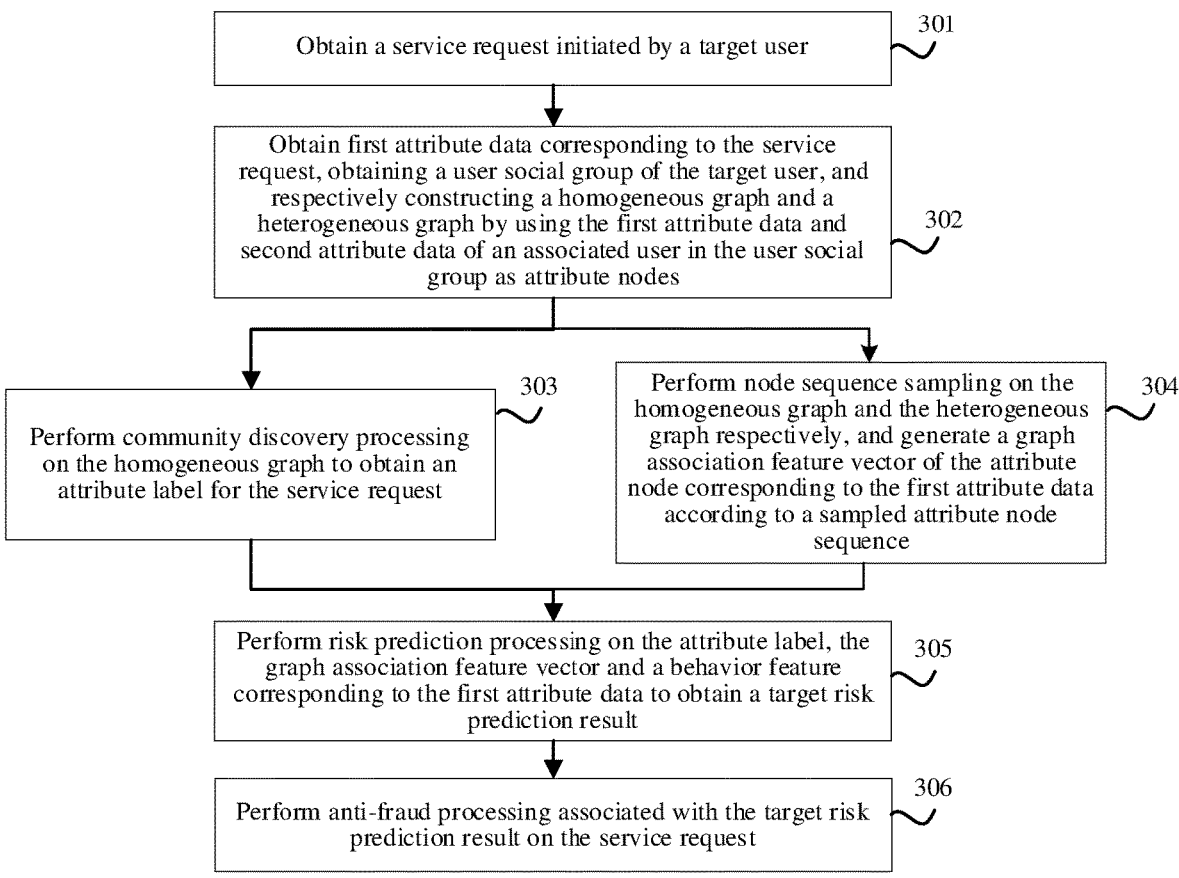

| | |
|---|---|
| Obtain a service request initiated by a target user | 301 |

Obtain first attribute data corresponding to the service request, obtaining a user social group of the target user, and respectively constructing a homogeneous graph and a heterogeneous graph by using the first attribute data and second attribute data of an associated user in the user social group as attribute nodes — 302

Perform community discovery processing on the homogeneous graph to obtain an attribute label for the service request — 303

Perform node sequence sampling on the homogeneous graph and the heterogeneous graph respectively, and generate a graph association feature vector of the attribute node corresponding to the first attribute data according to a sampled attribute node sequence — 304

Perform risk prediction processing on the attribute label, the graph association feature vector and a behavior feature corresponding to the first attribute data to obtain a target risk prediction result — 305

Perform anti-fraud processing associated with the target risk prediction result on the service request — 306

FIG. 3

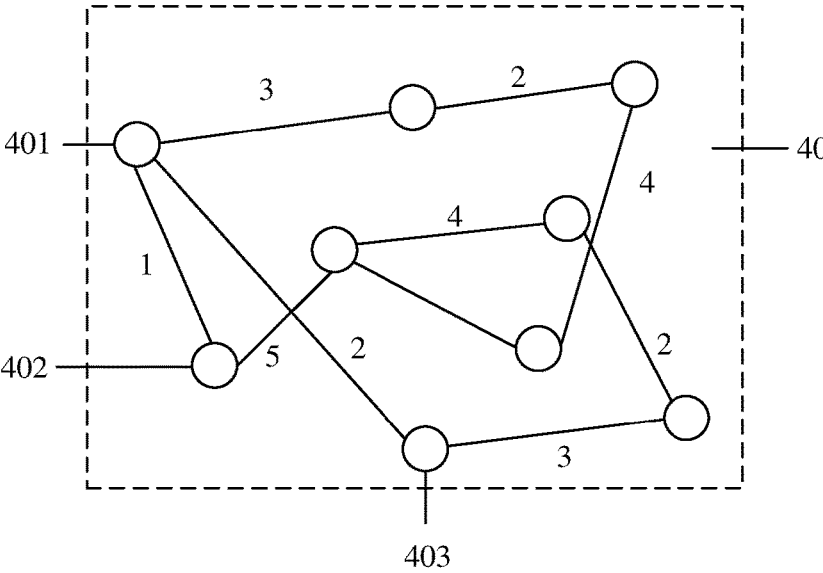

FIG. 4

DATA PROCESSING METHOD, COMPUTER DEVICE, AND READABLE STORAGE MEDIUM

CROSS-REFERENCES TO RELATED APPLICATIONS

This application is a continuation application of PCT Patent Application No. PCT/CN2021/107114, entitled "DATA PROCESSING METHOD, COMPUTER DEVICE AND READABLE STORAGE MEDIUM" and filed on Jul. 19, 2021, which claims priority to Chinese Patent Application No. 202110622162.9, entitled "DATA PROCESSING METHOD, COMPUTER DEVICE, AND READABLE STORAGE MEDIUM" filed with the China National Intellectual Property Administration on Jun. 3, 2021, the entire contents of both of which are incorporated herein by reference.

FIELD OF THE TECHNOLOGY

The present disclosure relates to the field of computer technologies, and in particular, to a data processing method, a computer device, and a readable storage medium.

BACKGROUND OF THE DISCLOSURE

In the traffic risk control industry, fraud traffic (also called fraudulent traffic or invalid traffic) exists in advertising, retail, e-commerce, travel and other industries, such as fraud impressions and clicks, fraud installations and activations, fraud registrations and logins, so on, resulting in a great loss of service expense.

In related technologies, fraud traffic is usually determined from massive service data by manual experience, the sources of fraud traffic are identified and analyzed, and malicious resources and malicious means that generate fraud traffic are labeled. Subsequently, traffic generated by the labeled malicious resources or malicious means can be quickly identified.

However, the resources and means that generate fraud traffic are constantly evolving, and the efficiency of manual labeling is low, which leads to insufficient detection coverage of fraud traffic and makes fraud traffic easy to avoid risk control, resulting in low detection accuracy.

SUMMARY

Embodiments of the present disclosure provide a data processing method, a computer device, and a readable storage medium, to improve the detection coverage and detection accuracy for fraud traffic. The technical solutions are as follows:

According to one aspect, a data processing method is provided, including: obtaining a service request initiated by a target user; obtaining first attribute data corresponding to the service request, obtaining a user social group of the target user, and respectively constructing a homogeneous graph and a heterogeneous graph by using the first attribute data and second attribute data of an associated user in the user social group as attribute nodes; performing community discovery processing on the homogeneous graph to obtain an attribute label for the service request; performing node sequence sampling on the homogeneous graph and the heterogeneous graph respectively and generating a graph association feature vector of the attribute node corresponding to the first attribute data; performing risk prediction processing on the attribute label, the graph association feature vector and a behavior feature corresponding to the first attribute data to obtain a target risk prediction result; and performing anti-fraud processing associated with the target risk prediction result on the service request. Here, the performing node sequence sampling on the homogeneous graph and the heterogeneous graph respectively and generating a graph association feature vector of the attribute node corresponding to the first attribute data includes: obtaining a homogeneous attribute node sequence from the homogeneous graph and obtaining a heterogeneous attribute node sequence from the heterogeneous graph; inputting the homogeneous attribute node sequence into a homogeneous graph embedding layer of a risk control detection model as a training sample for training, to obtain a homogeneous graph feature vector of an attribute node corresponding to the first attribute data; inputting the heterogeneous attribute node sequence into a heterogeneous graph embedding layer of the risk control detection model as a training sample for training, to obtain a heterogeneous graph feature vector of the attribute node corresponding to the first attribute data; and generating the graph association feature vector of the attribute node corresponding to the first attribute data based on the homogeneous graph feature vector and the heterogeneous graph feature vector.

According to another aspect, a data processing apparatus is provided, including: an obtaining module, configured to obtain a service request initiated by a target user; and obtain first attribute data corresponding to the service request, and obtain a user social group of the target user; a graph construction module, configured to respectively construct a homogeneous graph and a heterogeneous graph by using the first attribute data and second attribute data of an associated user in the user social group as attribute nodes; a label determining module, configured to perform community discovery processing on the homogeneous graph to obtain an attribute label for the service request; a graph vector determining module, configured to perform node sequence sampling on the homogeneous graph and the heterogeneous graph respectively, to obtain a sampled attribute node sequence, and generate a graph association feature vector of the attribute node corresponding to the first attribute data according to the sampled attribute node sequence; a risk determining module, configured to perform risk prediction processing on the attribute label, the graph association feature vector and a behavior feature corresponding to the first attribute data to obtain a target risk prediction result; and an anti-fraud module, configured to perform anti-fraud processing associated with the target risk prediction result on the service request.

According to another aspect, a computer device is provided, including: a processor and a memory, the processor being connected to the memory, and the memory being configured to store a computer program, the computer program, when executed by the processor, causes the computer device to perform the method in the embodiments of the present disclosure.

One aspect of the present disclosure provides a non-transitory computer-readable storage medium, storing a computer program, the computer program being configured to be loaded and executed by a processor, to cause a computer device including the processor to perform the method in the embodiments of the present disclosure.

The technical solutions provided in the embodiments of the present disclosure have at least the following beneficial effects:

By automatically extracting the attribute label, the graph association feature vector and the behavior feature that are used to characterize different dimension features of the service request and performing risk prediction processing on the service request based on these dimension features to obtain the target risk prediction result, the dimension features that are difficult to be found by manual experience can be mined, thereby improving the accuracy of the target risk prediction result. Then, by performing the anti-fraud (i.e., anti-cheating) processing on the service request based on the target risk prediction result, the detection coverage and detection accuracy for fraud traffic can be improved.

BRIEF DESCRIPTION OF THE DRAWINGS

To describe the technical solutions of the embodiments of the present disclosure more clearly, the following briefly introduces the accompanying drawings required for describing the embodiments. Apparently, the accompanying drawings in the following description show only some embodiments of the present disclosure, and a person of ordinary skill in the art may still derive other drawings from these accompanying drawings without creative efforts.

FIG. 3 is a schematic flowchart of a data processing method according to an embodiment of the present disclosure.

FIG. 4 is a schematic structural diagram of a homogeneous graph according to an embodiment of the present disclosure.

DESCRIPTION OF EMBODIMENTS

To make the objectives, technical solutions, and advantages of the present disclosure clearer, the following further describes implementations of the present disclosure in detail with reference to the accompanying drawings.

In the specification, claims, and the foregoing accompanying drawings of the present disclosure, the terms "first", "second", and so on are intended to distinguish between similar objects rather than indicating a specific order. It is to be understood that data used in this way is exchangeable in a proper case, so that the embodiments of the present disclosure described herein can be implemented in an order different from the order shown or described herein. Moreover, the terms "include," "comprise," and any other variants thereof mean are intended to cover a non-exclusive inclusion. For example, a process, method, system, product, or server that includes a list of steps or units is not necessarily limited to those expressly listed steps or units, but may include other steps or units not expressly listed or inherent to such a process, method, product, or device. The data processing method of the present disclosure will be described below. Although the specification provides method operation steps as described in embodiments or flowcharts, more or fewer operation steps may be included based on routine or non-creative efforts. The order of the steps listed in the embodiment is merely one of multiple step execution orders, and does not indicate the only execution order. When a system or server product is executed in practice, sequential execution or parallel execution may be performed according to the method orders shown in the embodiments or the accompanying drawings (for example, in a parallel processor or multi-thread processing environment).

Figure 1:
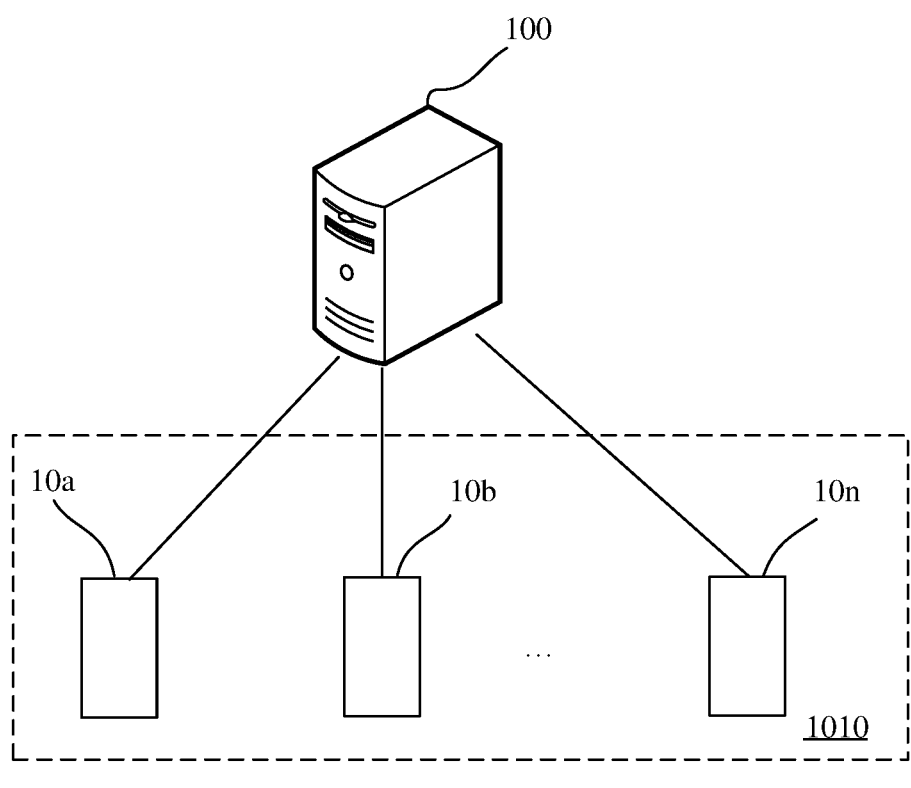
FIG. 1 is a schematic diagram of a network architecture according to an embodiment of the present disclosure.

The solutions provided in the embodiments of the present disclosure relate to technologies such as natural language processing and machine learning in artificial intelligence, and are specifically described through the following embodiments. FIG. 1 is a schematic diagram of a network architecture according to an embodiment of the present disclosure. As shown in FIG. 1, the system may include a service server 100 and a terminal device cluster 1010. The terminal device cluster 1010 may include a terminal device 10a, a terminal device 10b, . . . , and a terminal device 10n. A communication connection may exist between terminal devices in the terminal device cluster 1010. For example, a communication connection exists between the terminal device 10a and the terminal device 10b, and a communication connection exists between the terminal device 10b and the terminal device 10n. Any terminal device in the terminal device cluster 1010 may have a communication connection with the service server 100. For example, a communication connection exists between the terminal device 10a and the service server 100, and a communication connection exists between the terminal device 10b and the service server 100.

It is to be understood that an application client is installed on each of the terminal devices in the terminal device cluster 1010 shown in FIG. 1, when running in each of the terminal devices, can respectively exchange data with the service server 100 shown in FIG. 1 above so that the service server 100 can receive service data from each of the terminal devices. The application client can be an application client with a function of displaying data information such as text, image, audio and video, such as a game application, video editing application, social application, instant messaging application, live streaming application, short video application, video application, music application, shopping application, novel application, payment application and browser. The application client can be an independent client or an embedded sub-client integrated in a client (such as an instant messaging client, social client, video client, etc.), which is not limited herein.

After receiving a service request sent by each terminal device through the application client, the service server 100 executes a service method corresponding to the service request in response to the service request and returns a result of the execution to the application client. However, in order to seek benefits, people in the black market usually use fraud traffic or malicious click farming to initiate malicious service requests, which not only occupies network resources and computing and internal memory resources of the service server 100, but also causes errors in service data corresponding to the application client, making the service data no longer authentic.

For example, taking a shopping application as an example, the favorable rate of a commodity is one of the factors that users consider when purchasing the commodity. In order to increase the purchase rate of a commodity, some merchants perform a click farming operation on the commodity. For example, a same account is used to initiate multiple service requests to give positive feedbacks on this commodity, or a fake account is used to initiate a service request to give a positive feedback on this commodity. The service server 100 does not identify the authenticity of the service requests, responds to and executes these malicious service requests. As a result, the favorable rate of the commodity is much higher than the true favorable rate given by users.

For example, taking a video application as an example, the view count of a television drama is one of the indicators to measure the popularity of the television drama. In order to increase the view count of the television drama, some producers adopt improper playing methods, for example, through simulators, application cloners, cloud control, etc., to simulate fake terminal devices, install a video application, and initiate service requests for playing the television drama to the service server 100. The service server 100 does not identify the authenticity of the service requests, responds to and executes these malicious service requests. As a result, the view count of the television drama is much higher than the real view count.

In the embodiments of the present disclosure, after receiving a service request, the service server 100 obtains attribute data corresponding to the service request, then performs risk prediction on the service request based on the attribute data, identifies whether the service request is a real service request, and performs anti-fraud processing on the service request according to a result of the risk prediction.

Figure 2:
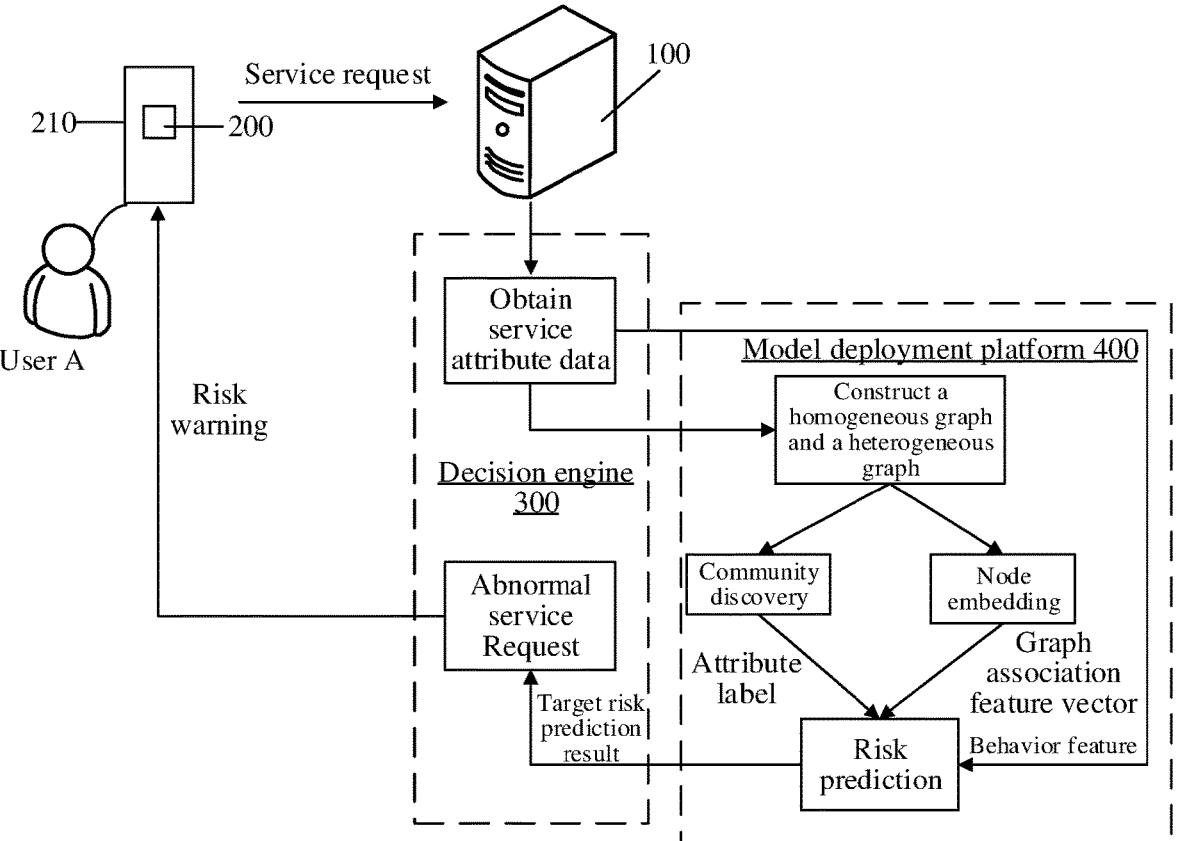
FIG. 2 is a schematic diagram of a risk warning scenario according to an embodiment of the present disclosure.

For example, FIG. 2 is a schematic diagram of a risk warning scenario according to an embodiment of the present disclosure. As shown in FIG. 2, a shopping application 200 is integrally installed on a terminal device 210 and user A is a user operating the terminal device 210. The user A initiates a service request for commenting on a commodity B to a service server 100 through the shopping application 200. Assuming that an account used by the user A to log in to the shopping application 200 is a fake account (such as a white number not authenticated by a real name, an account registered with a non-real name card in a virtual operator, etc.), if the service server 100 receives the service request and directly responds to the service request, the user A can comment on the commodity B through the fake account. The user A may log in to a plurality of fake accounts through the shopping application 200 of the terminal device 210 to comment on the commodity B, resulting in inconsistency between the quality of the commodity B and the comments, and causing losses to other users. Therefore, the service server 100 needs to perform risk prediction processing on the service request first, and the service server 100 may further deliver a corresponding risk prompt to the terminal device 210 based on the risk prediction result.

Specifically, when the service server 100 obtains a service request initiated by the user A, the service server 100 obtains service attribute data corresponding to the service request through a decision engine 300. The service attribute data includes a request account, a request mobile phone number, a request Internet Protocol (IP), a request device number and other attribute data. Then, the service server 100 invokes a risk control detection model in a model deployment platform 400 through the decision engine 300. Then, the model deployment platform 400 performs risk prediction on the service request based on the risk control detection model and the service attribute data to obtain a risk prediction result, and then returns the risk prediction result to the decision engine 300. The decision engine 300 performs anti-fraud processing according to the risk prediction result.

After obtaining the service attribute data corresponding to the service request through the decision engine 300, the service server 100 transmits the service attribute data to the risk control detection model. Then, the service server 100 obtains a user social group of the user A through the risk control detection model, where the user social group includes an associated user; and then respectively constructs a homogeneous graph and a heterogeneous graph by using the service attribute data and associated service attribute data of the associated user as attribute nodes. The associated service attribute data includes service attribute data, such as a request account, a request mobile phone number, a request IP, a request device number and the like, of the associated user. Both the homogeneous graph and the heterogeneous graph are composed of multiple attribute nodes and edges.

Attribute nodes in the homogeneous graph have the same attribute. An edge weight is determined by common information between attribute nodes. For example, the attribute nodes in the homogeneous graph are request accounts of different users. If common information between a request account 1 and a request account 2 is that the number of IPs shared is 2. In this case, an edge weight between the attribute node corresponding to the request account 1 and the attribute node corresponding to the request account 2 is 2.

There may be attribute nodes having different attributes in the heterogeneous graph. If there is a connection relationship between attribute nodes having different attributes, there is a connection edge between attribute nodes having different attributes. For example, an attribute node 3 corresponds to the request account 1, an attribute node 4 corresponds to a request device number 5, and the request account 1 is logged in to the request device number 5, there is a connection relationship between the attribute node 3 and the attribute node 4.

Then, community discovery processing is performed on the homogeneous graph to obtain an attribute label for the service request. Community discovery is to partition attribute nodes in the homogeneous graph, and partition closely related attribute nodes into the same community. The attribute label is a community attribute label of the community where the attribute node corresponding to the service attribute data of the service request is located. Attribute nodes belonging to the same community are closely related. For example, attribute node 1 and attribute node 3 in community A are illegal accounts, and the attribute node corresponding to the request account initiating the service request also belongs to community A, then the request account may also be an illegal account.

In addition, node embedding processing is performed on the homogeneous graph and the heterogeneous graph. To be specific, node sequence sampling is performed on the homogeneous graph and the heterogeneous graph respectively, and a graph association feature vector of the attribute node corresponding to the service attribute data is generated according to a sampled attribute node sequence. In addition, a behavior feature for the service request is generated based on the service attribute data. The generation of the graph association feature vector corresponding to the service attribute data according to the attribute node sequence can be realized by some vector modeling algorithms, such as a node2vec (node embedding) algorithm. Node embedding is mainly to vectorize a graph and presents the graph through vectors. The graph association feature vector is used to describe structural information and potential features of the homogeneous graphs and the heterogeneous graph, and can represent an association relationship between service attribute data and associated service attribute data in multiple attribute dimensions. The behavior feature is generated based on behavior statistics information associated with service attribute data in a certain historical time period. For example, the behavior statistics information may include: how many requests have been initiated by the request account in the last ten minutes, how many devices have the account logged in within the last hour, and so on. Finally, the attribute label, the graph association feature vector and the behavior feature are concatenated to obtain a target feature vector; then risk prediction is performed on the service request based on the target feature vector, and a risk prediction result is output and returned to the decision engine 300. The decision engine 300 may determine whether the service request is a normal service request or an abnormal service request based on the target risk prediction result.

As shown in FIG. 2, after the above-mentioned processing, the service server 100 determines through the decision engine 300 that the service request initiated by the user A is an abnormal service request, and the service server 100 rejects to execute a service method associated with the service request, and delivers an abnormal prompt to the terminal device 210.

It can be understood that the above-described processing procedure may be executed by the service server alone, by the terminal device alone, or jointly by the service server and the terminal device, which is not limited herein.

The above data processing solution can be applied to various scenarios where a service request needs to be initiated, such as games, videos, instant messaging, etc. The embodiments of the present disclosure only take a video application and a shopping application as examples for relevant description.

It may be understood that the method provided in the embodiments of the present disclosure may be executed by a computer device, which includes but is not limited to a terminal device or a service server. The service server may be an independent physical server, or may be a server cluster or distributed system including a plurality of physical servers, or may be configured as a cloud server providing basic cloud computing services, such as a cloud database, a cloud service, cloud computing, a cloud function, cloud storage, a network service, cloud communication, a middleware service, a domain name service, a security service, a content delivery network (CDN), big data, and an artificial intelligence platform. The terminal device may be a smart terminal capable of running the application client, such as a smart phone, tablet computer, notebook computer, desktop computer, palmtop computer, mobile internet device (MID), wearable device (such as a smart watch, smart band, etc.), or smart computer. The terminal device and the service server may be directly or indirectly connected in a wired or wireless manner, which is not limited in the embodiments of the present disclosure.

It can be understood that the above device (for example, the service server 100, terminal device 10a, terminal device 10b, . . . , or terminal device 10n) may be a node in a distributed system. The distributed system may be a block-chain system, which may be a distributed system formed by a plurality of nodes connected through network communication. A peer-to-peer (P2P) network is formed between the nodes. The P2P protocol is an application layer protocol that runs over the Transmission Control Protocol (TCP) protocol. In the distributed system, any form of computer device, such as a server, terminal device and other electronic device, can become a node in the blockchain system by joining the point-to-point network.

FIG. 3 is a flowchart of a data processing method according to an embodiment of the present disclosure. The method is executed by a computer device described in FIG. 1, which may be the service server 100 in FIG. 1 or the terminal device cluster 110 in FIG. 1. As shown in FIG. 3, the data processing method may include the following steps:

Step 301. Obtain a service request initiated by a target user.

In some embodiments, a first service request initiated by a target account is received. The target account is an account operated by the target user.

The target account corresponds to an associated account, and the associated account initiates a second service request.

In some embodiments, the target account is an account operated by a user, or the target account is an account operated by an automation tool. Specifically, fraud traffic may be generated by personnel in the black market by combining various black market resources on the market. For example, device resources have evolved from simulators, application cloners, and mobile phone generator software in the early stage to group control and cloud control. In 2020, a cloud mobile phone box has been proposed, claiming that a mobile phone box is equivalent to 600 mobile phones. IP resources have also evolved from proxy IP to second-level IP switching. The mobile phone number has also changed from a modem pool to a public code receiving platform, which has gradually changed to off-line code receiving as national regulations regarding code receiving platforms have been put into effect. That is to say, a service request may not be initiated by a real user, but may be generated by a black market personnel or an automation tool. Therefore, the target user using the target account can be understood as an imaginary user. That is, after receiving the service request, the computer device determines by default that the service request is initiated by an imaginary user, and the imaginary user has a binding relationship with service attribute data corresponding to the service request.

In some embodiments, if the target user corresponds to an associated user, the corresponding target account corresponds to an associated account. The associated account refers to an account directly or indirectly associated with the target account. The associated account is an account operated by a user, or an account operated by an automation tool. The associated account corresponding to the target account is determined according to attribute data of the target account. The attribute data includes an account number, a mobile phone number, an IP number, a device number and so on. For example, when the attribute data of the target account shares a same part with attribute data of a first account, the first account and the target account are considered to have a direct relationship. For example, if the device number of the target account is the same as that of the first account, it is considered that there is a direct relationship between the first account and the target account. If there is a direct relationship between the second account and the first account, it is considered that there is an indirect connection between the second account and the target account.

For ease of understanding, it is assumed that an account 1 initiates a service request A, and a computer device receives the service request A, and determines that attribute data corresponding to the service request A includes account 1, mobile phone number 2, IP number 3 and device number 4. If the user uses another mobile phone number, for example, a mobile phone number 5, to initiate a service request B, the computer device receives the service request B, and determines that attribute data corresponding to the service request B includes account 1, mobile phone number 5, IP number 3 and device number 4. Therefore, each service request is bound to a unique set of attribute data.

Step 302. Obtain first attribute data corresponding to the service request, obtaining a user social group of the target user, and respectively constructing a homogeneous graph and a heterogeneous graph by using the first attribute data and second attribute data of an associated user in the user social group as attribute nodes.

For example, the process of constructing the homogeneous graph and the heterogeneous graph includes: using attribute data corresponding to the service request and attribute data corresponding to an associated service of the associated user in the user social group as attribute nodes, where the number of attribute nodes is at least two, each of the attribute nodes has a corresponding attribute type, and for example, the attribute type includes an account type, an IP address type, a device number type, etc.; obtaining attribute nodes of a same attribute type among at least two attribute nodes as homogeneous attribute nodes; determining a first edge weight between the homogeneous attribute nodes according to common information of attribute data between the homogeneous attribute nodes, where the common information is, for example, a quantity of shared IPs; and constructing the homogeneous graph according to the homogeneous attribute nodes and the first edge weight.

For ease of understanding of the homogeneous graph, FIG. 4 is a schematic structural diagram of a homogeneous graph according to an embodiment of the present disclosure. As shown in FIG. 4, a homogeneous graph 40 includes a plurality of homogeneous attribute nodes such as a homogeneous attribute node 401, a homogeneous attribute node 402 and a homogeneous attribute node 403. Assuming that the homogeneous graph 40 is an account homogeneous graph, the homogeneous attribute node in the homogeneous graph 40 may be account data included in the attribute data. It can be understood that duplicate account data may be counted as the same account data, for which only one corresponding homogeneous attribute node is generated. For example, the homogeneous attribute node 401 is account 1, the homogeneous attribute node 402 is account 2, and the homogeneous attribute node 402 is account 3. Homogeneous attribute nodes may be connected by a weighted edge. As shown in FIG. 4, an edge weight between the homogeneous attribute node 401 and the homogeneous attribute node 402 is 1, an edge weight between the homogeneous attribute node 401 and the homogeneous attribute node 403 is 2, and there is no connection between the homogeneous attribute node 402 and the homogeneous attribute node 403, which can be understood as that the edge weight is 0. A weight of an edge between homogeneous attribute nodes are determined by common information between attribute data of the homogeneous attribute nodes. For example, when the homogeneous attribute nodes are accounts, the common information may be the quantity of shared IPs. In this case, when the edge weight between the homogeneous attribute node 401 and the homogeneous attribute node 402 is 1, it indicates that the quantity of IPs shared by account 1 and account 2 is 1.

A connection relationship between attribute nodes having an indirect attribute relationship is established according to an attribute relationship between every two attribute nodes in at least two attribute nodes, and the heterogeneous graph including at least two attribute nodes is constructed. The indirect attribute relationship means that there is an association relationship between attribute A of a first attribute node and attribute B of a second attribute node.

Figure 5:
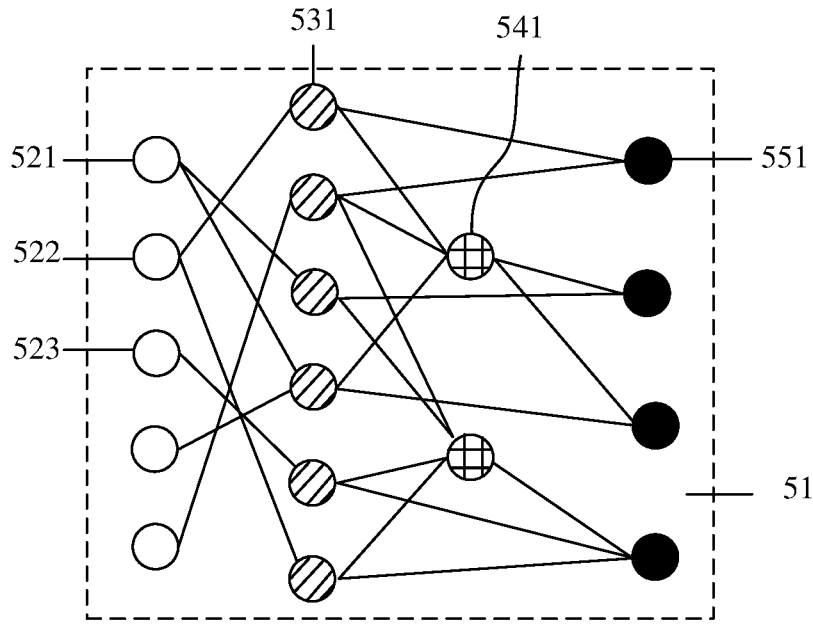
FIG. 5 is a schematic structural diagram of a heterogeneous graph according to an embodiment of the present disclosure.

For ease of understanding of the heterogeneous graph, FIG. 5 is a schematic structural diagram of a heterogeneous graph according to an embodiment of the present disclosure. As shown in FIG. 5, the heterogeneous graph includes attribute nodes of a plurality of attribute types, for example, a first attribute node 521, a second attribute node 531, a third attribute node 541, and a fourth attribute node 551. There may be a plurality of attribute nodes of the same attribute type. For example, attribute nodes having a first attribute include an attribute node 522, an attribute node 523, and so on. For any attribute data, a corresponding attribute node can be found in the heterogeneous graph. According to connection relationships between attribute nodes of different attribute types, a second edge weight between two attribute nodes can be determined. Assuming that the second attribute node 531 is device 1, the third attribute node 541 is device model a, and the model of device 1 is device model a, it indicates that the second attribute node 531 and the third attribute node 541 are related, and there is a connection edge between the second attribute node 531 and the third attribute node 541.

Step 303. Perform community discovery processing on the homogeneous graph to obtain an attribute label for the service request.

In some embodiments, community partitioning is performed on the attribute nodes in the homogeneous graph through a risk control detection model.

In some embodiments, the attribute nodes in the homogeneous graph are partitioned according to a modularity of the homogeneous graph to obtain a community partitioning result, where the modularity indicates a community structure strength of the homogeneous graph; then a community to which the attribute node corresponding to the first attribute data belongs is determined as a target community; and finally, a community attribute label of the target community is used as the attribute label for the service request. In the homogeneous graph, some attribute nodes are closely connected, and some attribute nodes are sparsely connected. The closely connected part can be regarded as a community. Two communities are relatively sparsely connected, and are called a community structure.

By partitioning the attribute nodes in the homogeneous graph according to the modularity of the homogeneous graph to obtain the community partitioning result, that is, partitioning the closely connected attribute nodes into a community, the value of the modularity will become larger. Finally, the division with the largest modularity is optimal community division. The modularity refers to a proportion of edges connecting vertices in the community structure in the network minus an expected proportion value of any edge connecting the two attribute nodes under the same community structure.

There are other ways to partition the attribute nodes in the homogeneous graph to obtain communities, such as: 1. minimum cut or normalized cut: calculating a minimum cut of the graph, dividing the network into a predetermined number of groups, and minimizing the number of edges connecting to the groups; 2. non-negative matrix factorization: the basic principle of which is to decompose an original matrix to obtain a community indication matrix and a base matrix; 3. community partitioning based on node similarity, etc., which will not be limited herein.

Step 304. Perform node sequence sampling on the homogeneous graph and the heterogeneous graph respectively, to obtain a sampled attribute node sequence, and generate a graph association feature vector of the attribute node corresponding to the first attribute data according to the sampled attribute node sequence.

In some embodiments, node sequence sampling is performed on the attribute nodes in the homogeneous graph and the heterogeneous graph through the risk control detection model.

In some embodiments, random walking is performed on the homogeneous graph, and the attribute nodes on a random walking path are sampled to obtain a homogeneous attribute node sequence; then a homogeneous graph feature vector of the attribute node corresponding to the first attribute data is generated according to the homogeneous attribute node sequence; random walking is performed on the heterogeneous graph, and the attribute nodes on a random walking path are sampled to obtain a heterogeneous attribute node sequence; then a heterogeneous graph feature vector of the attribute node corresponding to the first attribute data is generated according to the heterogeneous attribute node sequence; and finally, the homogeneous graph feature vector and the heterogeneous graph feature vector are concatenated to obtain the graph association feature vector of the attribute node corresponding to the first attribute data.

A process of randomly selecting a node from neighbor nodes of a particular node as a next hop node is called random walking. By performing random walking multiple times and sampling the attribute nodes on the random walking path, a walk sequence is obtained. The walk sequence includes all the attribute nodes on the random walking path, or the walk sequence includes some of the attribute nodes on the random walking path.

In some embodiments, the homogeneous attribute node sequence is input into a homogeneous graph embedding layer of the risk control detection model as a training sample for training, to obtain the homogeneous graph feature vector of the attribute node corresponding to the first attribute data, that is, a node embedding vector. Similarly, the heterogeneous attribute node sequence is input into a heterogeneous graph embedding layer of the risk control detection model as a training sample for training, to obtain the heterogeneous graph feature vector of the attribute node corresponding to the first attribute data.

Step 305. Perform risk prediction processing on the attribute label, the graph association feature vector and a behavior feature corresponding to the first attribute data to obtain a target risk prediction result.

In some embodiments, feature concatenating is performed on the attribute label, the graph association feature vector and the behavior feature corresponding to the first attribute data to obtain a target feature vector; then the target feature vector is inputted into a classification layer of a risk prediction model (e.g., risk control detection model), and determining risk probabilities of the target feature vector for at least two candidate risk type labels through the classification layer; then the risk value for the service request is generated according to the risk probabilities; and the candidate risk type label corresponding to a maximum risk probability in the risk probabilities respectively corresponding to the at least two candidate risk type labels is determined as the risk type label of the service request. The candidate risk type label is used to characterize the risk type corresponding to the service request, such as illegal account, illegal login IP, etc., and the risk value is used to describe a risk degree corresponding to the risk type.

In some embodiments, in determining the behavior feature corresponding to the service request, a historical service request sequence associated with the first attribute data is obtained; then historical service attribute data corresponding to a historical service request in the historical service request sequence is obtained; a historical time period to which the historical service request belongs is determined; request behavior statistical information corresponding to the service request is generated based on the historical service attribute data and the historical time period; and then the behavior feature corresponding to the service request is generated based on the request behavior statistical information. For example, the behavior feature corresponding to the service request can be the number of requests made by a mobile phone number in recent 1 hour, the number of IPs used by a mobile phone number in recent 10 minutes, and so on.

Step 306. Perform anti-fraud processing associated with the target risk prediction result on the service request.

In some embodiments, this step includes: obtaining an anti-fraud risk control strategy having a mapping relationship with the risk type label; obtaining a risk control threshold corresponding to the risk type label according to the anti-fraud risk control strategy; rejecting the service request in response to the risk value being greater than or equal to the risk control threshold; and responding to the service request in response to the risk value being less than the risk control threshold.

In some embodiments, after obtaining the risk prediction result related to the first service request, the risk prediction result is bound with the target account, and if a new service request initiated by the target account is received within a certain period of time, anti-fraud processing associated with the risk prediction result is directly performed on the new service request.

In some embodiments, the model deployment platform can also identify a plurality of sets of service attribute data in advance and predict risk prediction results off-line. When a service request is received, attribute data corresponding to the service request is obtained, and matched against the plurality of sets of attribute data predicted off-line, to obtain a risk prediction result corresponding to the attribute data matching the attribute data of the service request, and anti-fraud processing associated with the risk prediction result is directly performed on the first service request. This can improve the timeliness of identifying fraud traffic.

In some embodiments, the anti-fraud processing corresponding to the risk prediction result is performed on the first service request through a decision engine. The decision engine configures and executes a risk strategy, and the model deployment platform can quickly complete model deployment, testing, launching, updating and iteration.

A model base of the model deployment platform can contain multiple different versions and different types of risk control detection models for anti-fraud. The model deployment platform can perform traffic allocation for different versions and different types of risk control detection models, that is, determine an imaginary user group associated with each risk control detection model. For example, the model deployment platform performs risk control processing on a target application. The target application has 10,000 accounts. The model deployment platform can associate 1,000 accounts with a risk control detection model A and associate the other 9,000 accounts with a risk control detection model B. In this case, the risk control detection model A is associated with imaginary users in the imaginary user group. The model deployment platform may perform traffic allocation based on one or a combination of more than one of service attribute data such as account, IP number, mobile phone number and device number, which is not limited herein. After obtaining the first service request initiated by the target account, the computer device obtains a risk control detection model associated with the service request in the model base of the model deployment platform through the decision engine. The imaginary user group associated with the risk control detection model includes the target account.

To sum up, by automatically extracting the attribute label, the graph association feature vector and the behavior feature that are used to characterize different dimension features of the service request and performing risk prediction processing on the service request based on these dimension features to obtain the target risk prediction result, the dimension features that are difficult to be found by manual experience can be mined, thereby improving the accuracy of the target risk prediction result. Then, by performing the anti-fraud processing on the service request based on the target risk prediction result, the detection coverage and detection accuracy for fraud traffic can be improved.

Figure 6:
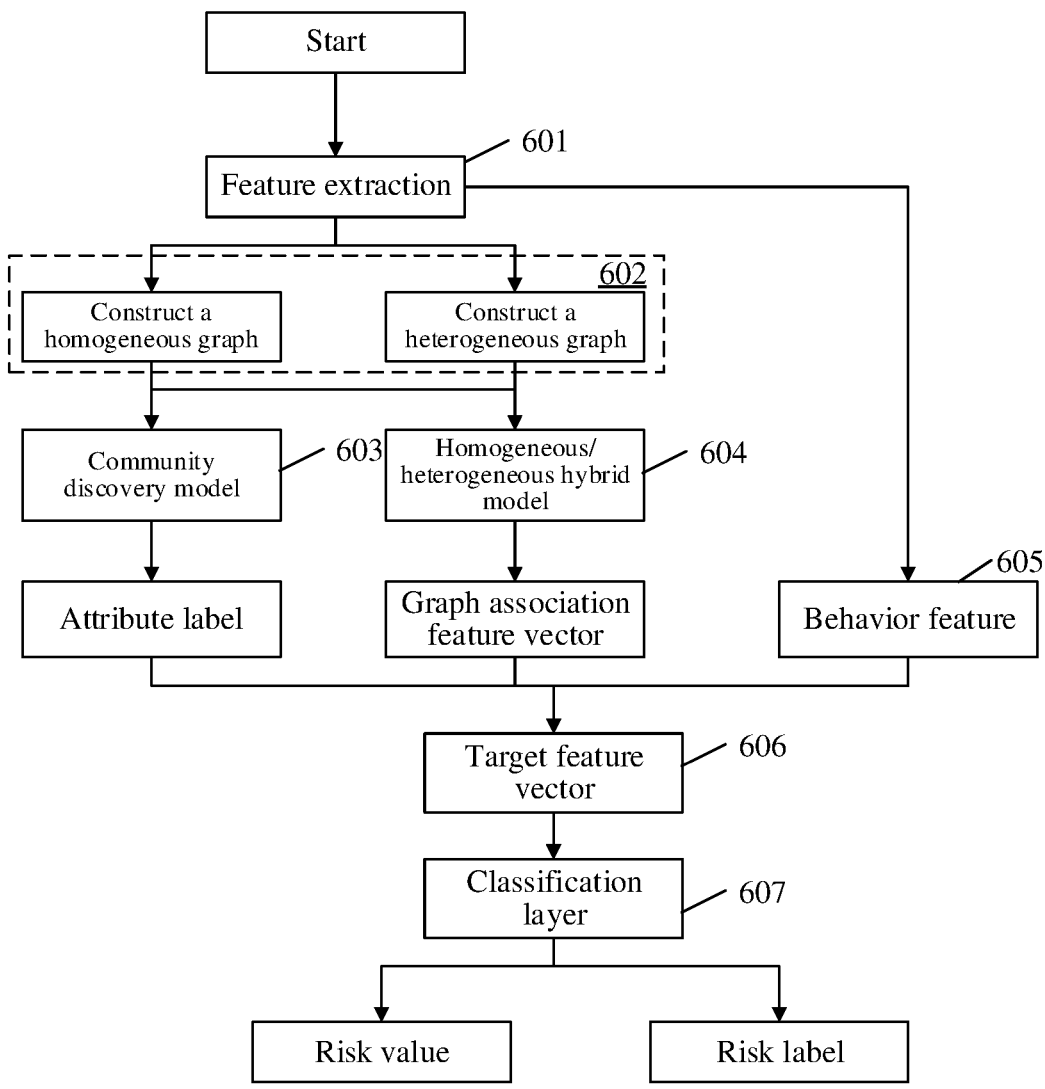
FIG. 6 is a schematic flowchart of a risk control detection method according to an embodiment of the present disclosure.

Further, FIG. 6 is a schematic flowchart of a risk control and detection method according to an embodiment of the present disclosure. The method is executed by a computer device described in FIG. 1, which may be the service server 100 in FIG. 1 or the terminal device cluster 110 in FIG. 1. As shown in FIG. 6, the process of the risk control detection method is as follows.

Step 601. Perform feature extraction on service data associated with a service request to obtain attribute data.

Specifically, for a service request received on-line in real time, the computer device may obtain service data associated with the service request through an interface corresponding to the decision engine. The computer device performs feature extraction processing on the obtained service data to extract required attribute data, such as: account, device number, IP and other information. In some embodiments, each time after the computer device processes a service request, the computer device saves service data, such as account, device number, mobile phone number and IP, corresponding to the service request into a database, for calling in subsequent model training or behavior feature construction.

Step 602. Construct a homogeneous graph and a heterogeneous graph based on the attribute data.

In some embodiments, after the attribute data are obtained, the attribute data is input into a homogeneous model and a heterogeneous model respectively, so that the homogeneous model outputs a corresponding homogeneous graph and the heterogeneous model outputs a corresponding heterogeneous graph. The homogeneous model and the heterogeneous model can be unsupervised learning models. The computer device trains the homogeneous model and the heterogeneous model based on unlabeled attribute data.

In some embodiments, the number of homogeneous graphs is one or more. For example, according to the obtained attribute data, a first homogeneous graph with an attribute type being account and a second homogeneous graph with an attribute type being IP are constructed. This is not limited in the embodiments of the present disclosure.

Step 603. Perform community discovery processing on the homogeneous graph through a community discovery model, and obtain an attribute label.

Specifically, for each homogeneous graph, a community attribute label of a community to which an attribute node corresponding to first attribute data in the homogeneous graph belongs can be mined as an attribute label through a modularity-based community discovery (fast unfolding) model.

Figure 7:
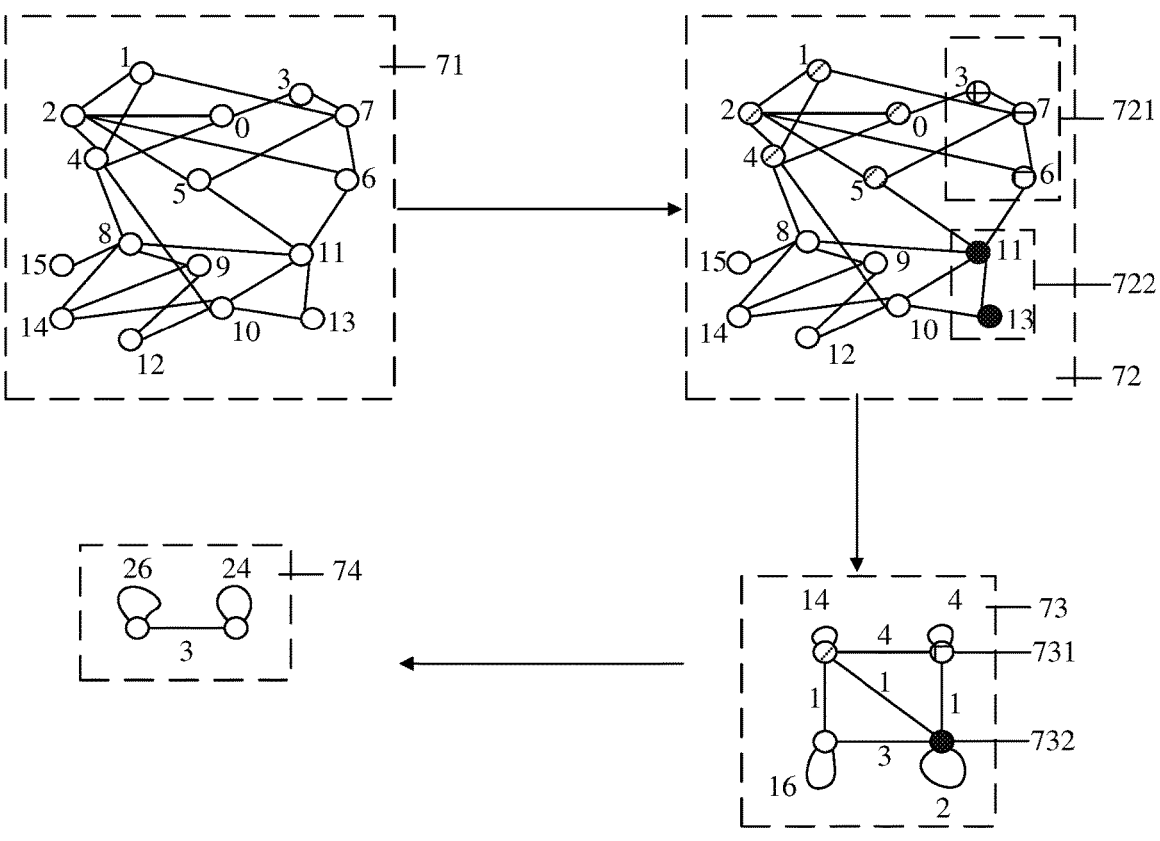
FIG. 7 is a schematic diagram of community discovery processing according to an embodiment of the present disclosure.

For ease of understanding, FIG. 7 is a schematic diagram of community discovery processing according to an embodiment of the present disclosure. The computer device partitions the attribute nodes in the homogeneous graph according to the modularity of the homogeneous graph to obtain communities. This operation mainly includes two stages. As shown in FIG. 7, the first stage is modularity optimization, which mainly divides partitioning each attribute node into a node community where an adjacent attribute node of the attribute node is located, so as to cause the value of modularity to increase. A specific process is as follows:

First, initialization is performed to partition attribute nodes in a homogeneous graph 71 into initial communities respectively, i.e., each attribute node is regarded as an initial community. Then, an i-th attribute node in the homogeneous graph is transferred to the initial community where the neighbor attribute node is located to obtain a transfer community; The neighbor node has a connection relationship with the i-th attribute node in the homogeneous graph, and i is a positive integer less than or equal to a total number of the attribute nodes in the homogeneous graph. A modularity change value is determined based on the initial community and the transfer community. To be specific, the modularity corresponding to the transfer community is subtracted from the modularity corresponding to the transfer community to obtain the modularity change value. That is to say, an attempt is made to partition each attribute node into the community where the neighbor attribute node of the attribute node is located, a current modularity is calculated, and it is determined whether a modularity difference $\Delta Q$ before and after partitioning is positive. If the modularity difference is positive, the partitioning attempt is accepted. If the modularity difference is not positive, the partitioning attempt is abandoned.

The calculation of modularity can be realized by the following formula (1):

$$Q = \frac{1}{2m} \sum_c \left[ \sum_{in} - \left( \frac{\sum_{tot}}{2m} \right)^2 \right] \qquad \text{formula (1)}$$

where $\sum_{in}$ represents a weight within a community c, $\sum_{tot}$ represents a sum of edge weights between communities, m represents a sum of all weights of the graph, and Q represents modularity.

The calculation of $\Delta Q$ can be realized by the following formula (2):

$$\Delta Q = \frac{k_{i,in}}{2m} - \frac{\sum_{tot} k_i}{2m^2} \qquad \text{formula (2)}$$

where $k_{i,in}$ represents a weight between an attribute node i and an attribute node in, the attribute node in refers to a neighbor attribute node of the attribute node i, and $k_i$ represents a sum of weights of all edges connected with the attribute node i.

The above process is repeated until the modularity can no longer be increased, that is, no matter which attribute node is moved to the community where the neighbor attribute node is located, the modularity change value is not positive, and in this case, it is determined that the modularity change value satisfies a community aggregation condition. As shown in FIG. 7, after the modularity optimization is performed on the homogeneous graph 71, a transfer homogeneous graph 72 is obtained, which includes four transfer communities. For convenience of understanding, attribute nodes in different transfer communities are marked with different colors. Attribute nodes in each transfer community are relatively closely connected, and different transfer communities are relatively sparsely connected. For example, attribute nodes in a transfer community 722 are closely connected, and a transfer community 721 and the transfer community 722 are sparsely connected. Then, at the second stage, the computer device performs community aggregation: using the transfer communities as a reconstructed attribute node to obtain a reconstructed homogeneous graph, that is, aggregating the transfer communities obtained through partitioning at the first stage into a reconstructed attribute node, and then reconstructing a homogeneous network according to the community structure generated at the first stage. Community aggregation processing is performed on the transfer homogeneous graph 72 to obtain a reconstructed homogeneous graph 73. As shown in the reconstructed homogeneous graph 73, each reconstructed attribute node represents one transfer community. An edge weight between the reconstructed attribute nodes is the sum of edge weights of all attribute nodes in the corresponding transfer community As shown in FIG. 5, assuming that weights of edges are all 1 in the transfer homogeneous graph 72, and an edge between the transfer community 722 and the transfer community 721 includes only a connection edge whose edge weight is 1 between the attribute node 11 and the attribute node 6, an edge weight between a reconstructed attribute node 731 and a reconstructed attribute node 732 in the reconstructed homogeneous graph 73 is 1.

Then, if a community structure of the reconstructed homogeneous graph is the same as that of the homogeneous graph, the transfer community corresponding to the reconstructed homogeneous graph is determined as the community partitioning result; if the community structure of the reconstructed homogeneous graph is different from that of the homogeneous graph, transfer processing continues to be performed on reconstructed attribute nodes in the reconstructed homogeneous graph. That is, since the community structures of the homogeneous graph 71 and the reconstructed homogeneous graph 73 are different, the computer device repeatedly performs the first and second stages on the reconstructed homogeneous graph 73 to obtain a new reconstructed homogeneous graph until the community structure of the new reconstructed homogeneous graph no longer changes. Assuming that the finally obtained community structure which no longer changes is a reconstructed homogeneous graph 74, the computer device determines the corresponding transfer community in the reconstructed homogeneous graph 74 as the community partitioning result. Each community is identified by a community attribute label. The computer device determines a community to which the attribute node corresponding to the first attribute data belongs as a target community; and uses a community attribute label of the target community as the attribute label for the service request.

Step 604. Perform node embedding processing on the homogeneous graph and the heterogeneous graph through a homogeneous/heterogeneous hybrid model to obtain a graph association feature vector.

In some embodiments, the purpose of node embedding is to map entities into a continuous vector space. Node embedding is to retain information in the graph by embedding. For example, according to an embedding vector of a certain node, a neighbor of the node in the graph can be found. An embedding vector of a certain node can be directly used as an input of a downstream task. The idea of node embedding is random walking. Attribute nodes on the random walking path are sampled to obtain an attribute node sequence, and then a vector representation of attribute nodes is obtained by modeling this sequence by processing word vectors.

Figure 8:
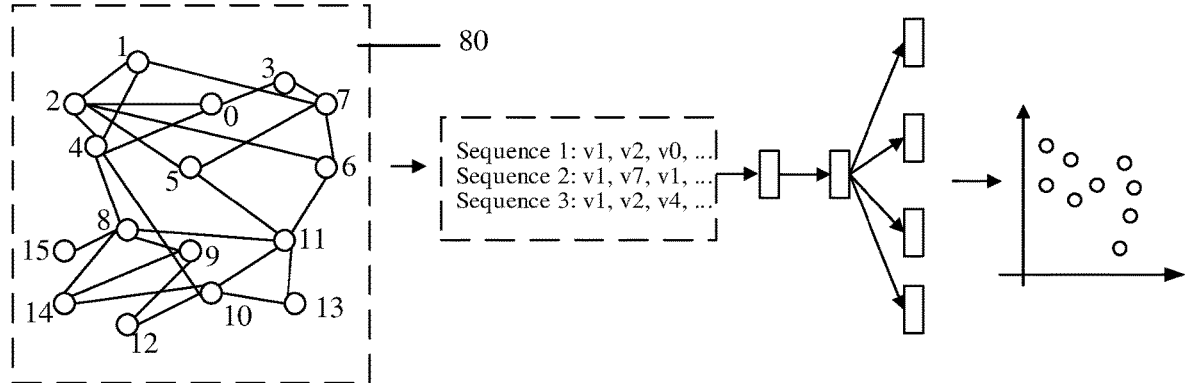
FIG. 8 is a schematic diagram of a scenario implementing node embedding on a homogeneous graph according to an embodiment of the present disclosure.

For ease of understanding, referring to FIG. 8, FIG. 8 is a schematic diagram of a scenario implementing node embedding on a homogeneous graph according to an embodiment of the present disclosure. A computer device obtains a sequence length parameter; then randomly selects an attribute node in a homogeneous graph and adds the attribute node to a sampled node sequence; and then uses the attribute node added into the sampled node sequence as a target sampled node. Afterwards, the computer device randomly selects an attribute node from neighbor nodes of the target sampled node and adds the randomly selected attribute node to the sampled node sequence; if the total number of attribute nodes in the sampled node sequence is equal to the sequence length parameter, stops random walking and node sequence sampling, and determines the sampled node sequence as a homogeneous attribute node sequence; and If the total number of attribute nodes in the sampled node sequence is less than the sequence length parameter, determines the attribute node newly added into the sampled node sequence as a new target sampled node, and continues to randomly select an attribute node from neighbor nodes of the new target sampled node and add the randomly selected attribute node to the sampled node sequence. As shown in FIG. 8, after the sampling is performed on the homogeneous graph 80, a sequence 1, a sequence 2 and a sequence 3 are obtained. The sequence 1 includes v1, v2, v0, . . . where v1 is attribute node 1, v2 is attribute node 2, and v0 is attribute node 0. A process of obtaining three homogeneous attribute node sequences can be as follows: It is assumed that the sequence length parameter is 10. During random walking and sampling, the computer device first randomly selects the attribute node 1 as a target sampled node, and then randomly selects the attribute node 2 from neighbor nodes of the attribute node 1 and adds the attribute node 2 into a sampled node sequence. In this case, there are only two attribute nodes in the sampled node sequence, and the computer device uses the attribute node 2 as the target sampled node and continues sampling, until ten attribute nodes are included in the sampled node sequence. The computer device uses the sampled node sequence as a homogeneous attribute node sequence. The computer device can collect multiple homogeneous attribute node sequences according to actual setting requirements. Then, the computer device inputs the collected multiple homogeneous attribute node sequences to a skip-gram (a type of neural network) model, so that the model outputs a homogeneous feature vector corresponding to the homogeneous graph.

Similarly, a heterogeneous feature vector corresponding to the heterogeneous graph can also be obtained. Then, the homogeneous graph feature vector and the heterogeneous graph feature vector are concatenated to obtain the graph association feature vector of the attribute node corresponding to the first attribute data. With the use of the homogeneous/heterogeneous hybrid model, behavior and relationship chain data between the first attribute data is mined to obtain the graph association feature vector, without being limited to the modularity of graph, so that more dimensional feature information for representing the service request can be provided.

Step 605. Determine a behavior feature corresponding to the attribute data.

A historical service request sequence associated with the first attribute data in a statistical time period is pulled. Request behavior statistical information corresponding to the first attribute data is generated based on historical service attribute data corresponding to a historical service request in the historical service request sequence and a historical time period to which the historical service request belongs. Then, a behavior feature corresponding to the first attribute data is generated based on the request behavior statistical information.

Step 606. Obtain a target feature vector according to the attribute label, the graph association feature vector and the behavior feature.

Step 607. Input the target feature vector into a classification layer, and output a risk value and a risk label.

In some embodiments, the classification layer can be implemented by a supervised learning model, such as XGBoost model. For implementations of step 606 and 607, refer to the implementations of steps 305 and 306 in the embodiment shown in FIG. 3, which will not be repeated herein.

With the method provided in the embodiments of the present disclosure, an attribute label, a graph association feature vector and a behavior feature used to characterize a service request can be obtained through the risk control detection model. The attribute label, the graph association feature vector and the behavior feature are concatenated to obtain a target feature vector, which characterizes the service request from multiple dimensions. Finally, a risk score and a risk type of the service request are output based on the target feature vector. Therefore, the detection coverage and detection accuracy for fraud traffic can be improved.

Figure 9:
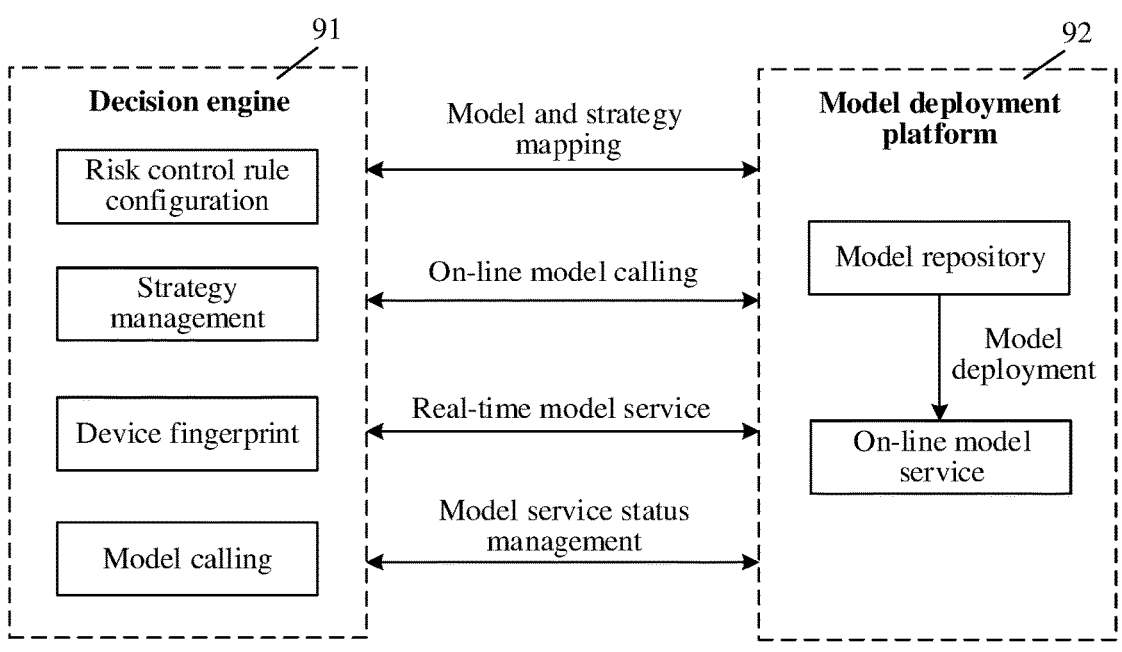
FIG. 9 is a schematic diagram showing a relationship of a decision engine and a model deployment platform according to an embodiment of the present disclosure.

FIG. 9 is a schematic diagram showing a relationship of a decision engine and a model deployment platform according to an embodiment of the present disclosure. As shown in FIG. 9, a model deployment platform 92 includes a model repository, which can store a plurality of different types and versions of risk control detection models. The model deployment platform 92 can deploy each risk control detection model in the model repository as an online model service, so that a decision engine can call the risk control detection model to obtain a real-time model service. The model deployment platform 92 can determine a target user group associated with the risk control detection model in response to a traffic configuration operation for the risk control detection model, and then the risk control detection model will be used to respond to a service request initiated by the target user group.

As shown in FIG. 9, the decision engine 91 can provide functions such as risk control rule configuration, strategy management, device fingerprint identification, model calling and the like. The risk control rule configuration means that the decision engine 91 can generate a risk control strategy for the target user group in response to a risk control strategy configuration operation for the target user group. The risk control strategy includes a processing type field and an anti-fraud processing strategy associated with the processing type field. For example, the processing type field is true, and the associated anti-fraud processing strategy may be "allow to respond to service request"; the processing type field is false, and the associated anti-fraud processing strategy may be "reject service request". The strategy management means mapping at least two risk prediction results of the risk control detection model with the processing type field. For example, the risk prediction result includes a first risk prediction result and a second risk prediction result, the first risk prediction result is mapped to the processing type field being true, and the second risk prediction result is mapped to the processing type field being false.

As shown in FIG. 9, after the mapping configuration between the risk control strategy of the decision engine 91 and the risk control detection model in the model deployment platform 92 is completed, the decision engine 91 can call the risk control detection model as an on-line model, and then the model deployment platform 92 can provide a real-time risk control detection model service through the called risk control detection model. A specific process is as follows:

After receiving a service request of a target user, the decision engine 91 calls a risk control detection model associated with a target user group to which the target user belongs, and then transmits service data related to the service request of the target user to the risk control detection model. The risk control detection model outputs a target risk prediction result based on the service request and returns the target prediction result to the decision engine 91. The decision engine 91 then determines a processing type field having a mapping relationship with the target risk prediction result as a target processing type field; and then performs the anti-fraud processing on the service request according to the anti-fraud processing strategy associated with the target processing type field. For example, the target prediction result is the above first risk prediction result. In this case, because the first risk prediction result is mapped to the processing type field being true, and the anti-fraud processing strategy associated with the processing type field being true may be "allow to respond to service request", the decision engine 91 does not intercept the service request, and the computer device responds to the service request and executes a service method associated with the service request.

As shown in FIG. 9, the decision engine 91 and the model deployment platform 92 further jointly manage a status of the real-time risk control detection model service provided by the risk control detection model. The model deployment platform 92 collects statistics on calling of each risk control detection model in the model repository, memory usage, running status, etc., and transmits the information to the decision engine 91. Then a service status of each risk control detection model can be displayed in real time through the decision engine 91. Strategy setting personnel can manage the risk control detection model by performing configuration operations such as resource partitioning, upgrade and rollback, pause and activation according to the displayed service status.

As shown in FIG. 9, the device fingerprint identification function of the decision engine 91 may be used to verify a device number and fingerprint information of a target user that initiates a service request, and responds to the service request if the verification is successful. The decision engine 91 can further provide a real-time indicator calculation service, to calculate association and statistical data between accounts in a period of time in real time, so as to identify an association between and abnormal behavior of accounts in service transactions.

By adopting the method provided by the embodiments of the present disclosure, the risk control strategies and the mapping relationship between the risk control strategies and the risk control detection models can be adjusted at any time through the decision engine, and no additional development and deployment is required, which saves time and effort, and can quickly respond to the changes of the black market.

Figure 10:
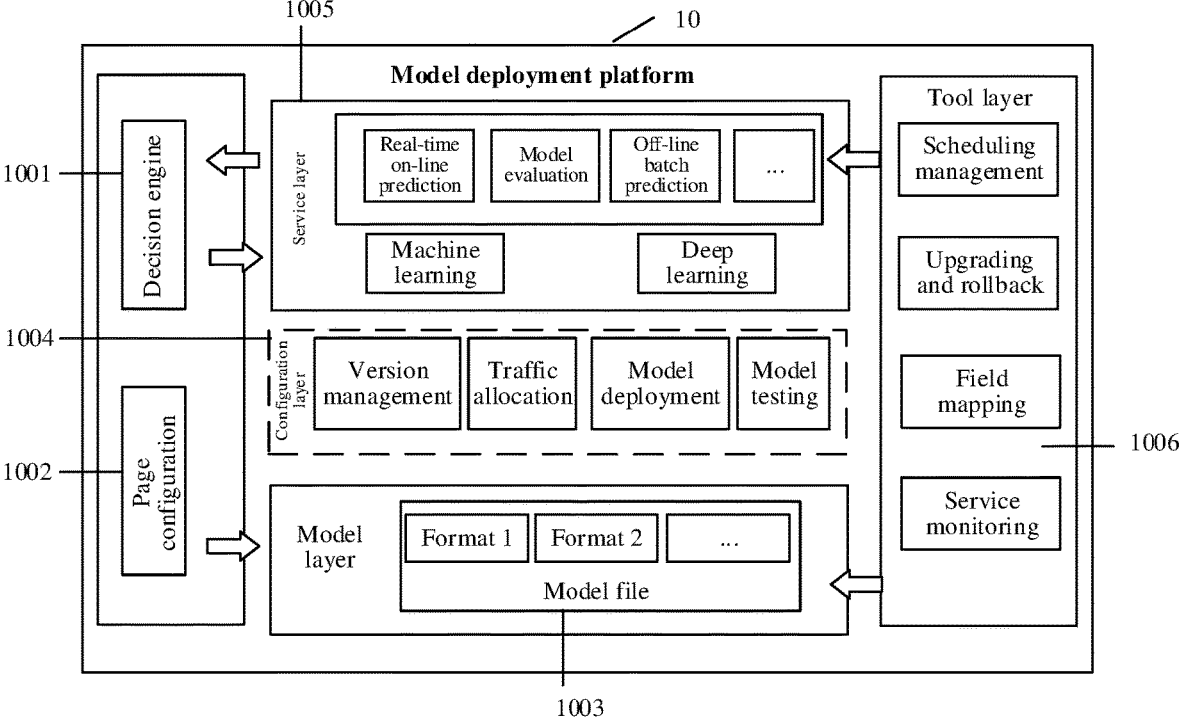
FIG. 10 is a schematic architectural diagram of a model deployment platform according to an embodiment of the present disclosure.

Further, FIG. 10 is a schematic architectural diagram of a model deployment platform according to an embodiment of the present disclosure. As shown in FIG. 10, a model deployment platform 10 may include a decision engine 1001 a page configuration layer 1002, a model layer 1003, a configuration layer 1004, a service layer 1005, and a tool layer 1006.

After training a risk control detection model, model training personnel can upload the model file through a page corresponding to the page configuration layer 1001. The model layer 1003 can support a variety of model file formats such as Predictive Model Markup Language (pmml), pb (a type of binary file), zip (a file format for data compression and document storage) and .m (a type of program text file) to satisfy machine learning models, tree models, and model files of different deep learning libraries. That is, after obtaining, through the model layer 1003, a to-be-deployed risk control model file uploaded through the page configuration layer 1002, the model deployment platform 10 can identify a model file format of the risk control model file and parsing the risk control model file based on the model file format to obtain a risk control detection model corresponding to the risk control model file. The model deployment platform 10 can then perform version management, traffic allocation, model deployment and model testing of the risk control detection model through the configuration layer 1004. Specifically, In the model deployment platform 10, model version information is allocated to the risk control detection model through the configuration layer 1004 in response to a version management operation initiated for the risk control detection model. then, the risk control detection model is tested in response to a deployment and launching operation initiated for the risk control detection model to obtain test service quality; and the risk control detection model and the model version information are added to a model base in the model deployment platform in response to the test service quality satisfying a model launching condition. The model version information can be used to distinguish risk control detection models with different functions; can also be used to distinguish the same series of risk control detection models that are used to meet different usage requirements of different users, for example, risk control detection models with the same function that are suitable for different operating environments or different platforms; and can also be used to distinguish old and new risk control detection models. After an old risk control detection model has been put into use for a period of time and needs to be modified, developers make significant modifications or corrections to provide enhanced functions or improved performance, and then upload the new risk control detection model. The process of testing the risk control detection model to obtain test service quality may be: obtaining off-line sample attribute data through the model deployment platform; then performing off-line prediction processing on the risk control detection model based on the off-line sample data to obtain an off-line prediction result; and evaluating the test service quality of the risk control detection model based on an error between the off-line prediction result and the risk control label. The off-line sample attribute data is labeled with a risk control label, and the risk control label is used for characterizing a risk of the off-line sample attribute data.

As shown in FIG. 10, after the successful deployment of the risk control detection model, the service layer 1005 can provide a risk control detection service. After the risk control detection service is launched, an ability of calling the risk control detection service of the risk control detection model can be configured in the decision engine 1001. A service field corresponding to the service data is mapped into an input parameter of the risk control detection model, and an output of the risk control detection model is returned to the decision engine 1001 and configured in a risk control strategy and rule. After the input parameter and output configuration of the risk control detection model in the embodiment corresponding to FIG. 2 is completed, the model deployment platform 10 can execute the descriptions in steps S101 to S106 in the embodiment corresponding to FIG. 2.

As shown in FIG. 10, the model deployment platform 10 can provide functions such as scheduling management, upgrading and rollback, field mapping, and service monitoring through the tool layer 1006. The field mapping is used to establish a mapping relationship between the output of the risk control detection model and the risk control strategy in the decision engine 1001. Understandably, the field mapping function realizes the decoupling of the risk control detection model and the risk control strategy, When the risk control strategy changes, it is only necessary to adjust the mapping relationship between the new risk control strategy and the risk control detection model through field mapping, without re-launching the risk control detection model, so that the risk control strategy can be updated more efficiently, thereby achieving faster response to the evolution of resources and means used by black market personnel to generate fraud traffic. The service monitoring process can be: recording a predicted risk control detection result obtained by the risk control detection model in response to the service request initiated by the target user group into a model execution log corresponding to the risk control detection model through the tool layer 1006 of the model deployment platform 10; then monitoring a risk status of the target user group within a period of time, and determining an actual risk label of the target user group according to the risk status; generating risk control strategy quality for the risk control detection model based on an error result between the actual risk label and the predicted risk control detection result in the model execution log; and generating a strategy adjustment prompt for the risk control detection model in response to the risk control strategy quality not satisfying a risk control condition. The strategy adjustment prompt is used for prompting to adjust the anti-fraud processing strategy associated with the risk control detection model. The service monitoring can further include: recording running data of each model, and then generating a running supervision result for each model based on an identification result in a model service execution log and a call amount and resource occupation amount of each model service. The running data includes call amounts and resource occupation amounts of each model service in different time periods. The risk control strategy quality and the running supervision result obtained through the service monitoring can be visually displayed through a page corresponding to the tool layer 1006, so that strategy setting personnel can learn about the status of the risk prediction service provided by the risk control detection model at any time. Through the tool layer 1006, strategy setting personnel can perform scheduling management and upgrading and rollback of the risk control detection model according to the service monitoring result. The scheduling management can be adjusting the amount of resources and memory occupied by the risk control detection model according to the call amount of the risk control detection model to ensure the maximum utilization of resources. The upgrading and rollback can be that if the risk control strategy quality of a new version of risk control detection model does not meet expectations, rollback to an old version of risk control detection model is performed, and the new version of risk control detection model is trained and optimized again before being re-launched.

In one embodiment, to ensure the scalability of the automatic model deployment platform, the model layer can support model files in a PMML file format. A PMML file has the features of platform independence and compatibility. Decoupling of the model deployment platform and the model training platform can be realized through PMML. After the risk control detection model is trained, the risk control detection model can be quickly deployed through the model deployment platform by exporting the risk control detection model and converting the risk control detection model into the PMML format. Compatibility means that a PMML-compliant model deployment platform can read and deploy standard PMML files exported by other platforms. Therefore, the model deployment platform can adopt a PMML standard model specification, and integrate an AI Serving (an open source machine learning and deep learning model deployment reasoning system) library and a Tensorflow Serving (a flexible and high-performance application system suitable for machine learning models) library to provide on-line prediction model service. Example machine learning models adopt AI Serving, and deep learning models adopt Tensorflow Serving. The model deployment service provides good performance and high stability. On a single 8-core 16G (Gigabyte, a decimal unit) machine, QPS (Queries-per-second) can reach 30,000/s, and for 99.99% of the queries, the delay is not greater than 100 ms, which can meet delay requirements of traffic risk control customers. In other words, the machine can process 30,000 service requests in parallel in a second with a processing time not greater than 100 ms. The automatic model deployment platform does not depend on the model training platform. The model deployment platform can run independently to provide services. The model service can satisfy highly concurrent requests of the decision engine. The model deployment platform supports monitoring of server resources and service execution statuses, can run various commonly used machine learning models and models generated in various common platform environments, and supports dockers to rapidly deploy model services. The platform has the advantages of low coupling, high concurrency, high stability, high model compatibility and support for rapid deployment. It can be understood that, as the number of users in a social network can be thousands, millions, and even billions, their attribute data form a data pool with a volume in a magnitude of Megabytes, Gigabytes, Terabytes, or even more. Multiple service requests from the users that need traffic risk analysis can occur concurrently. In other words, the volume of data being processed in the disclosed embodiment can also reach a magnitude of Megabytes, Gigabytes, Terabytes, or even more.

Figure 11:
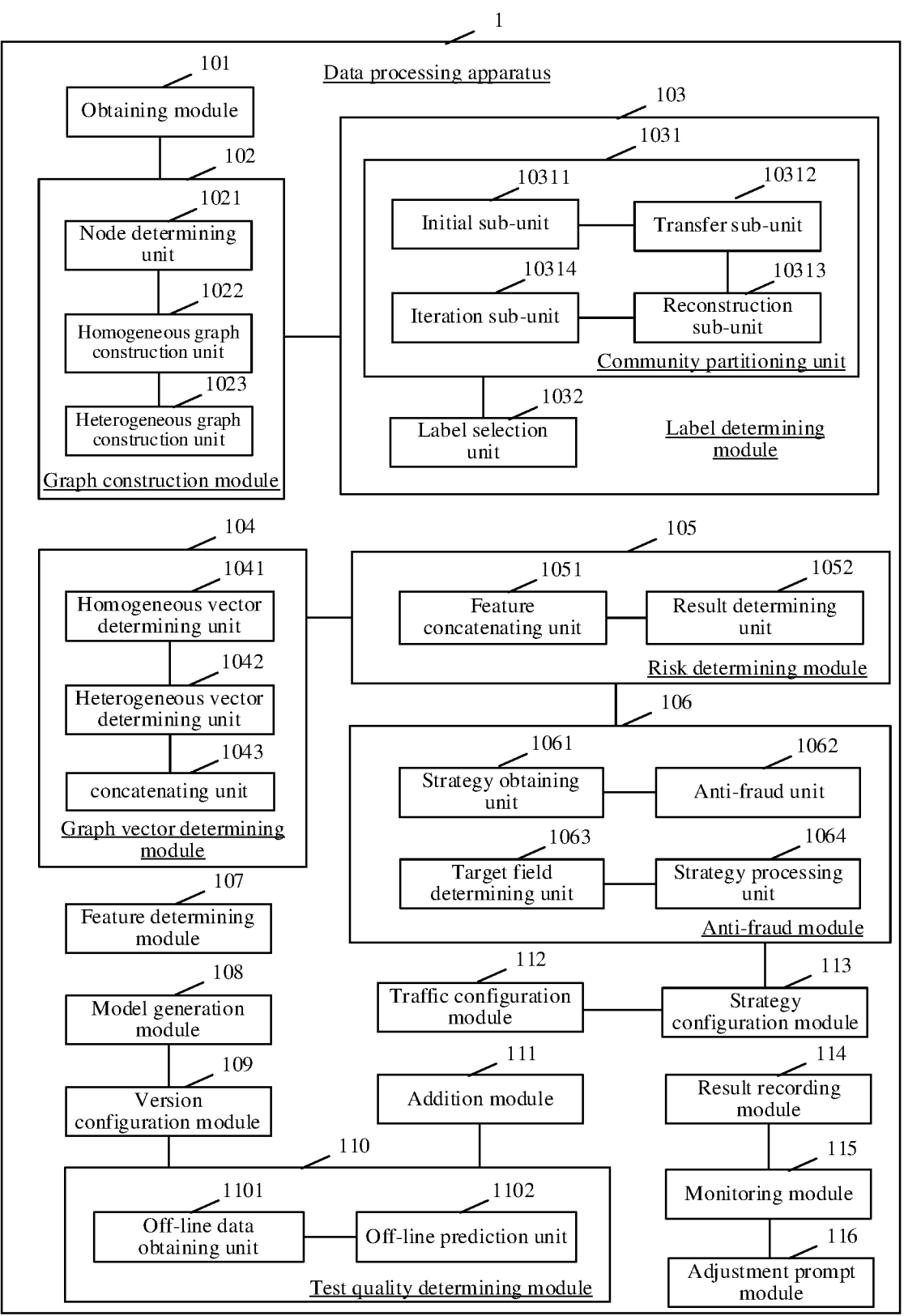
FIG. 11 is a schematic structural diagram of a data processing apparatus according to an embodiment of the present disclosure.

FIG. 11 is a schematic structural diagram of a data processing apparatus according to an embodiment of the present disclosure. The data processing apparatus may be a computer program (including program code) running in a computer device. For example, the data processing apparatus is an application software. The data processing apparatus may be configured to execute the corresponding steps in the method provided in the embodiments of the present disclosure. As shown in FIG. 11, the data processing apparatus includes:

an obtaining module 101, configured to obtain a service request initiated by a target user;

and obtain first attribute data corresponding to the service request, and obtain a user social group of the target user;

a graph construction module 102, configured to respectively construct a homogeneous graph and a heterogeneous graph by using the first attribute data and second attribute data of an associated user in the user social group as attribute nodes;

a label determining module 103, configured to perform community discovery processing on the homogeneous graph to obtain an attribute label for the service request;

a graph vector determining module 104, configured to perform node sequence sampling on the homogeneous graph and the heterogeneous graph respectively, and generate a graph association feature vector of the attribute node corresponding to the first attribute data according to a sampled attribute node sequence;

a risk determining module 105, configured to perform risk prediction processing on the attribute label, the graph association feature vector and a behavior feature corresponding to the first attribute data to obtain a target risk prediction result; and an anti-fraud module 106, configured to perform anti-fraud processing associated with the target risk prediction result on the service request.

The graph construction module 102 includes: a node determining unit 1021, a homogeneous graph construction unit 1022 and a heterogeneous graph construction unit 1023.

The node determining unit 1021 is configured to determine the first attribute data and the second attribute data as attribute nodes.

The homogeneous graph construction unit 1022 is configured to obtain attribute nodes of a same attribute type among at least two attribute nodes as homogeneous attribute nodes.

The homogeneous graph construction unit 1022 is further configured to determine a first edge weight between the homogeneous attribute nodes according to common information of attribute data between the homogeneous attribute nodes.

The homogeneous graph construction unit 1022 is further configured to construct the homogeneous graph according to the homogeneous attribute nodes and the first edge weight.

The apparatus further includes: a heterogeneous graph construction unit 1023, configured to establish a connection relationship between attribute nodes having an indirect attribute relationship according to an attribute relationship between every two attribute nodes in at least two attribute nodes, and construct the heterogeneous graph including at least two attribute nodes.

The label determining module 103 includes: a community partitioning unit 1031 and a label selection unit 1032.

The community partitioning unit 1031 is configured to partition the attribute nodes in the homogeneous graph according to a modularity of the homogeneous graph to obtain a community partitioning result, where the modularity indicates a community structure strength of the homogeneous graph.

The label selection unit 1032 is configured to determine a community to which the attribute node corresponding to the first attribute data belongs as a target community.

The label selection unit 1032 is further configured to use a community attribute label of the target community as the attribute label for the service request.

The community partitioning unit 1031 includes: an initial subunit 10311, a transfer subunit 10312, a transfer subunit 10312, and an iteration subunit 10314.

The initial subunit 10311 is configured to partition the attribute nodes in the homogeneous graph into initial communities respectively.

The transfer subunit 10312 is configured to transfer an i-th attribute node in the homogeneous graph to the initial community where a neighbor attribute node is located to obtain a transfer community, where the neighbor node has a connection relationship with the i-th attribute node, and i is a positive integer less than or equal to a total number of attribute nodes.

The transfer subunit 10312 is further configured to determine a modularity change value based on the initial community and the transfer community.

The reconstruction subunit 10313 is configured to obtain the community partitioning result based on the transfer community in response to the modularity change value satisfying a community aggregation condition.

In some embodiments, the reconstruction subunit 10313 is configured to obtain a reconstructed homogeneous graph based on the transfer community;

the iteration subunit 10314 is further configured to determine the transfer community as the community partitioning result in response to a community structure of the reconstructed homogeneous graph being the same as that of the homogeneous graph; and the iteration subunit 10314 is further configured to continue to perform transfer processing on reconstructed attribute nodes in the reconstructed homogeneous graph until the community partitioning result is obtained, in response to the community structure of the reconstructed homogeneous graph being different from that of the homogeneous graph.

The graph vector determining module 104 includes: a homogeneous vector determining unit 1041, a heterogeneous vector determining unit 1042 and a concatenating unit 1043.

The homogeneous vector determining unit 1041 is configured to perform random walking on the homogeneous graph, and sampling the attribute nodes on a path to obtain a homogeneous attribute node sequence.

The homogeneous vector determining unit 1041 is further configured to generate a homogeneous graph feature vector of the attribute node corresponding to the first attribute data according to the homogeneous attribute node sequence.

The heterogeneous vector determining unit 1042 is configured to perform random walking on the heterogeneous graph, and sampling the attribute nodes on a path to obtain a heterogeneous attribute node sequence.

The heterogeneous vector determining unit 1042 is further configured to generate a heterogeneous graph feature vector of the attribute node corresponding to the first attribute data according to the heterogeneous attribute node sequence.

The concatenating unit 1043 is configured to concatenate the homogeneous graph feature vector and the heterogeneous graph feature vector to obtain the graph association feature vector of the attribute node corresponding to the first attribute data.

The target risk prediction result includes a risk value and a risk type label.

The risk determining module 105 includes: a feature concatenating unit 1051 and a result determining unit 1052.

The feature concatenating unit 1051 is configured to perform feature concatenating on the attribute label, the graph association feature vector and the behavior feature corresponding to the first attribute data to obtain a target feature vector.

The result determining unit 1052 is configured to input the target feature vector into a classification layer of a risk prediction model, and determine risk probabilities of the target feature vector for at least two candidate risk type labels through the classification layer.

The result determining unit 1052 is further configured to generate the risk value for the service request according to the risk probabilities; and determine the candidate risk type label corresponding to a maximum risk probability in the risk probabilities respectively corresponding to the at least two candidate risk type labels as the risk type label of the service request.

The anti-fraud module 106 includes: a strategy obtaining unit 1061 and an anti-fraud unit 1062.

The strategy obtaining unit 1061 is configured to obtain an anti-fraud risk control strategy having a mapping relationship with the risk type label.

The anti-fraud unit 1062 is configured to obtain a risk control threshold corresponding to the risk type label according to the anti-fraud risk control strategy.

The anti-fraud unit 1062 is further configured to reject the service request in response to the risk value being greater than or equal to the risk control threshold.

The anti-fraud unit 1062 is further configured to respond to the service request in response to the risk value being less than the risk control threshold.

The data processing apparatus 1 further includes: a feature determining module 107.

The feature determining module 107 is configured to obtain a historical service request sequence associated with the first attribute data.

The feature determining module 107 is further configured to obtain historical service attribute data corresponding to a historical service request in the historical service request sequence; determine a historical time period to which the historical service request belongs; generate request behavior statistical information corresponding to the first attribute data based on the historical service attribute data and the historical time period; and generate a behavior feature corresponding to the first attribute data based on the request behavior statistical information.

In some embodiments, the community discovery processing performed on the homogeneous graph, the node sequence sampling performed on the homogeneous graph and the heterogeneous graph respectively, and the risk prediction processing performed on the attribute label, the graph association feature vector and the behavior feature corresponding to the first attribute data are implemented through a risk control detection model.

The data processing apparatus 1 further includes: a model generation module 108, a version configuration module 109, a test quality determining module 110, and an addition module 111.

The model generation module 108 is configured to obtain a risk control model file to be deployed through a model deployment platform.

The model generation module 108 is further configured to identify a model file format of the risk control model file and parsing the risk control model file based on the model file format to obtain a risk control detection model corresponding to the risk control model file.

The version configuration module 109 is configured to allocate model version information to the risk control detection model in the model deployment platform in response to a version management operation initiated for the risk control detection model.

The test quality determining module 110 is configured to test the risk control detection model in response to a deployment and launching operation initiated for the risk control detection model to obtain test service quality.

The addition module 111 is configured to add the risk control detection model and the model version information to a model base in the model deployment platform in response to the test service quality satisfying a model launching condition.

The test quality determining module 110 includes: an off-line data obtaining unit 1101 and an off-line prediction unit 1102.

The off-line data acquisition unit 1101 is configured to obtain off-line sample attribute data through the model deployment platform, where the off-line sample attribute data is labeled with a risk control label, and the risk control label is used for characterizing a risk of the off-line sample attribute data.

The off-line prediction unit 1102 is configured to perform off-line prediction processing on the risk control detection model based on the off-line sample data to obtain an off-line prediction result.

The off-line prediction unit 1102 is further configured to evaluate the test service quality of the risk control detection model based on an error between the off-line prediction result and the risk control label.

The data processing apparatus 1 further includes: a traffic configuration module 112 and a strategy configuration module 113.

The traffic configuration module 112 is configured to determine a target user group associated with the risk control detection model through the model deployment platform in response to a traffic configuration operation for the risk control detection model, where the target user group includes the target user, and the risk control detection model is used for responding to a service request initiated by the target user group.

The strategy configuration module 113 is configured to generate a risk control strategy for the target user group through a decision engine in response to a risk control strategy configuration operation for the target user group, where the risk control strategy includes a processing type field and an anti-fraud processing strategy associated with the processing type field.

The strategy configuration module 113 is further configured to map at least two risk prediction results of the risk control detection model with the processing type field.

The anti-fraud module 106 includes: a target field determining unit 1061 and a strategy processing unit 1062.

The target field determining unit 1061 is configured to determine, through the decision engine, a processing type field having a mapping relationship with the target risk prediction result as a target processing type field.

The strategy processing unit 1062 is configured to perform the anti-fraud processing on the service request according to the anti-fraud processing strategy associated with the target processing type field.

The data processing apparatus 1 further includes: a result recording module 114, a monitoring module 115, and an adjustment prompt module 116.

The result recording module 114 is configured to record a predicted risk prediction result obtained by the risk control detection model in response to the service request initiated by the target user group into a model execution log corresponding to the risk control detection model.

The monitoring module 115 is configured to monitor a risk status of the target user group, and determine an actual risk label of the target user group according to the risk status.

The adjustment prompt module 116 is configured to generate risk control strategy quality for the risk control detection model based on an error result between the actual risk label and the predicted risk prediction result in the model execution log.

The adjustment prompt module 116 is further configured to generate a strategy adjustment prompt for the risk control detection model in response to the risk control strategy quality not satisfying a risk control condition, where the strategy adjustment prompt is used for prompting to adjust the anti-fraud processing strategy associated with the risk control detection model.

To sum up, with the apparatus provided in the embodiments of the present disclosure, by automatically extracting the attribute label, the graph association feature vector and the behavior feature that are used to characterize different dimension features of the service request and performing risk prediction processing on the service request based on these dimension features to obtain the target risk prediction result, the dimension features that are difficult to be found by manual experience can be mined, thereby improving the accuracy of the target risk prediction result. Then, by performing the anti-fraud processing on the service request based on the target risk prediction result, the detection coverage and detection accuracy for fraud traffic can be improved.

The term module (and other similar terms such as sub-module, unit, subunit, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

Figure 12:
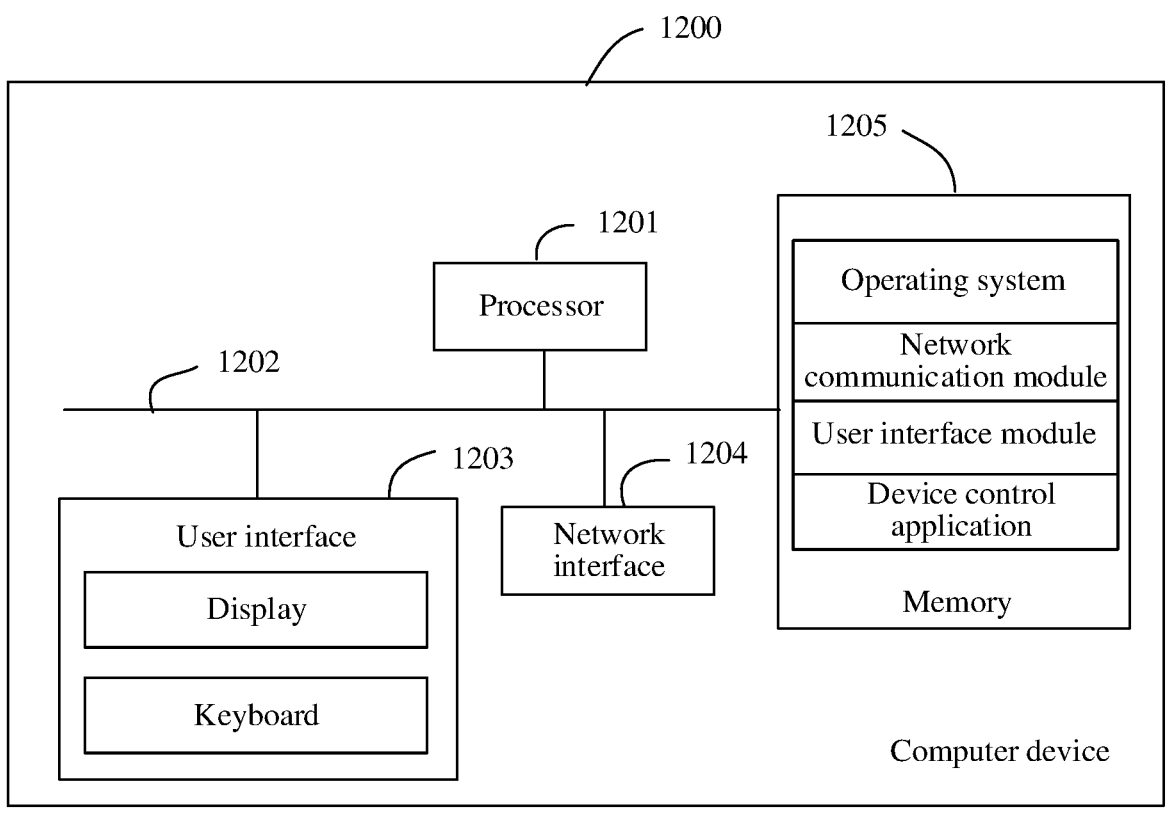
FIG. 12 is a schematic structural diagram of a computer device according to an embodiment of the present disclosure.

Further, FIG. 12 is a schematic structural diagram of a computer device according to an embodiment of the present disclosure. As shown in FIG. 12, the data processing apparatus 1 in the embodiment corresponding to FIG. 9 can be applied to the computer device 1200. The computer device 1200 can include: a processor 1201, a network interface 1204, and a memory 1205. In addition, the computer device 1200 further includes: a user interface 1203 and at least one communication bus 1202. The communication bus 1202 is configured to implement connection and communication between these components. The user interface 1203 may include a display and a keyboard. In some embodiments, the user interface 1203 may further include a standard wired interface and a standard wireless interface. In some embodiments, the network interface 1204 may include a standard wired interface and a standard wireless interface (for example, a Wi-Fi interface). The memory 1205 may be a high-speed RAM, or may be a non-volatile memory, for example, at least one magnetic disk memory. In some embodiments, the memory 1205 may alternatively be at least one storage apparatus located away from the processor 1201. As shown in FIG. 12, the memory 1205 used as a computer-readable storage medium may include an operating system, a network communication module, a user interface module, and a device control application.

In the computer device 1200 shown in FIG. 12, the network interface 1204 may provide a network communication function, the user interface 1203 is mainly configured to provide an input interface for a user, and the processor 1201 may be configured to invoke the device control application stored in the memory 1205, to implement:

obtaining a service request initiated by a target user, and obtaining a risk control detection model associated with the service request in a model base in a model deployment platform through a decision engine;

obtaining first attribute data corresponding to the service request, obtaining a user social group of the target user, and respectively constructing a homogeneous graph and a heterogeneous graph by using the first attribute data and associated service attribute data of an associated user in the user social group as attribute nodes;

performing community discovery processing on the homogeneous graph through the risk control detection model to obtain an attribute label for the service request;

performing node sequence sampling on the homogeneous graph and the heterogeneous graph respectively through the risk control detection model, and generating a graph association feature vector of the attribute node corresponding to the first attribute data according to a sampled attribute node sequence;

performing risk prediction processing on the attribute label, the graph association feature vector and a behavior feature corresponding to the first attribute data through the risk control detection model to obtain a target risk prediction result; and performing anti-fraud processing associated with the target risk prediction result on the service request through the decision engine.

It is to be understood that the computer device 1200 described in the embodiments of the present disclosure may execute the description of the data processing method in the foregoing embodiments, and may also execute the description of the data processing apparatus in the foregoing embodiment corresponding to FIG. 11, and the details will not be repeated here. In addition, beneficial effects achieved by using the same method are not described herein again.

In addition, an embodiment of the present disclosure further provides a computer-readable storage medium, storing a computer program executed by the data processing apparatus 1 mentioned above. When the processor loads and executes the computer program, the description of the data processing method described in any of the foregoing embodiments can be executed. Therefore, the details will not be repeated here. In addition, beneficial effects achieved by using the same method are not described herein again. For technical details that are not disclosed in the embodiment of the computer-readable storage medium of the present disclosure, refer to the descriptions of the method embodiments of the present disclosure.

The computer-readable storage medium may be the data processing apparatus provided in any one of the foregoing embodiments or an internal storage unit of the computer device described above, for example, a hard disk or an internal memory of the computer device. The computer-readable storage medium may alternatively be an external storage device of the computer device, for example, a removable hard disk, a smart media card (SMC), a secure digital (SD) card, or a flash card equipped on the computer. Further, the computer-readable storage medium may include both an internal storage unit and an external storage device of the computer device. The computer-readable storage medium is configured to store the computer program and other program and data that are required by the computer device. The computer-readable storage medium may further be configured to temporarily store data that has been output or data to be output.

The foregoing disclosure is merely exemplary embodiments of the present disclosure, and certainly is not intended to limit the protection scope of the present disclosure. Therefore, equivalent variations made in accordance with the claims of the present disclosure fall within the scope of the present disclosure.

What is claimed is:

1. A data processing method, applied to a computer device, the method comprising:

obtaining a service request initiated by a terminal device of a target user;

obtaining first attribute data corresponding to the service request, obtaining a user social group of the target user, and respectively constructing a homogeneous graph and a heterogeneous graph by using the first attribute data and second attribute data of an associated user in the user social group as attribute nodes;

performing community discovery processing on the homogeneous graph to obtain an attribute label for the service request;

performing node sequence sampling on the homogeneous graph and the heterogeneous graph respectively, and generating a graph association feature vector of the attribute node corresponding to the first attribute data, comprising:

obtaining a homogeneous attribute node sequence from the homogeneous graph and obtaining a heterogeneous attribute node sequence from the heterogeneous graph;

inputting the homogeneous attribute node sequence into a homogeneous graph embedding layer of a risk control detection model as a training sample for training, to obtain a homogeneous graph feature vector of an attribute node corresponding to the first attribute data;

inputting the heterogeneous attribute node sequence into a heterogeneous graph embedding layer of the risk control detection model as a training sample for training, to obtain a heterogeneous graph feature vector of the attribute node corresponding to the first attribute data; and generating the graph association feature vector of the attribute node corresponding to the first attribute data based on the homogeneous graph feature vector and the heterogeneous graph feature vector;

performing real-time risk prediction processing on the attribute label, the graph association feature vector and a behavior feature corresponding to the first attribute data, to obtain a target risk prediction result; and performing real-time anti-fraud processing associated with the target risk prediction result on the service request, comprising:

in response to the target risk prediction result indicating the service request being an abnormal service request activity, rejecting to execute a service method associated with the service request, the abnormal service request comprising at least one of a click farming operation, fraud traffic, or operating a user account by simulating a fake terminal device.

2. The method according to claim 1, wherein the constructing a homogeneous graph by using the first attribute data and second attribute data of an associated user in the user social group as attribute nodes comprises:

determining the attribute nodes by using the first attribute data and the second attribute data;

obtaining attribute nodes of a same attribute type among at least two of the attribute nodes as homogeneous attribute nodes;

determining a first edge weight between the homogeneous attribute nodes according to common information of attribute data between the homogeneous attribute nodes; and constructing the homogeneous graph according to the homogeneous attribute nodes and the first edge weight.

3. The method according to claim 1, wherein the constructing a heterogeneous graph by using the first attribute data and second attribute data of an associated user in the user social group as attribute nodes comprises:

establishing a connection relationship between attribute nodes having an indirect attribute relationship according to an attribute relationship between two attribute nodes corresponding to different attribute types in the attribute nodes, and constructing the heterogeneous graph comprising the attribute nodes.

4. The method according to claim 1, wherein the performing community discovery processing on the homogeneous graph to obtain an attribute label for the service request comprises:

partitioning the attribute nodes in the homogeneous graph according to a modularity of the homogeneous graph to obtain a community partitioning result, wherein the modularity indicates a community structure strength of the homogeneous graph;

determining a community to which the attribute node corresponding to the first attribute data belongs as a target community; and using a community attribute label of the target community as the attribute label for the service request.

5. The method according to claim 4, wherein the partitioning the attribute nodes in the homogeneous graph according to a modularity of the homogeneous graph to obtain a community partitioning result comprises:

partitioning the attribute nodes in the homogeneous graph into initial communities respectively;

transferring an i-th attribute node in the homogeneous graph to the initial community wherein a neighbor attribute node is located to obtain a transfer community, wherein the neighbor node has a connection relationship with the i-th attribute node, and i is a positive integer less than or equal to a total number of the attribute nodes;

determining a modularity change value based on the initial community and the transfer community; and obtaining the community partitioning result based on the transfer community in response to the modularity change value satisfying a community aggregation condition.

6. The method according to claim 5, wherein the obtaining the community partitioning result based on the transfer community comprises:

obtaining a reconstructed homogeneous graph based on the transfer community;

determining the transfer community as the community partitioning result in response to a community structure of the reconstructed homogeneous graph being the same as that of the homogeneous graph; and continuing to perform transfer processing on reconstructed attribute nodes in the reconstructed homogeneous graph until the community partitioning result is obtained, in response to the community structure of the reconstructed homogeneous graph being different from that of the homogeneous graph.

7. The method according to claim 1, wherein the performing node sequence sampling on the homogeneous graph and the heterogeneous graph respectively, to obtain a sampled attribute node sequence, and generating a graph association feature vector of the attribute node corresponding to the first attribute data according to the sampled attribute node sequence comprises:

performing random walking on the homogeneous graph, and sampling the attribute nodes on a path to obtain the homogeneous attribute node sequence;

performing random walking on the heterogeneous graph, and sampling the attribute nodes on a path to obtain the heterogeneous attribute node sequence;

concatenating the homogeneous graph feature vector and the heterogeneous graph feature vector to obtain the graph association feature vector of the attribute node corresponding to the first attribute data.

8. The method according to claim 1, wherein the target risk prediction result comprises a risk value and a risk type label; and the performing risk prediction processing on the attribute label, the graph association feature vector and a behavior feature corresponding to the first attribute data to obtain a target risk prediction result comprises:

performing feature concatenating on the attribute label, the graph association feature vector and the behavior feature corresponding to the first attribute data to obtain a target feature vector;

inputting the target feature vector into a classification layer of the risk control detection model, and determining risk probabilities of the target feature vector for at least two candidate risk type labels through the classification layer;

generating the risk value for the service request according to the risk probabilities; and determining the candidate risk type label corresponding to a maximum risk probability in the risk probabilities respectively corresponding to the at least two candidate risk type labels as the risk type label of the service request.

9. The method according to claim 8, wherein the performing anti-fraud processing associated with the target risk prediction result on the service request comprises:

obtaining an anti-fraud risk control strategy having a mapping relationship with the risk type label;

obtaining a risk control threshold corresponding to the risk type label according to the anti-fraud risk control strategy;

rejecting the service request in response to the risk value being greater than or equal to the risk control threshold; and responding to the service request in response to the risk value being less than the risk control threshold.

10. The method according to claim 1, wherein the method further comprises:

obtaining a historical service request sequence associated with the first attribute data;

obtaining historical service attribute data corresponding to a historical service request in the historical service request sequence;

determining a historical time period to which the historical service request belongs;

generating request behavior statistical information corresponding to the first attribute data based on the historical service attribute data and the historical time period; and generating a behavior feature corresponding to the first attribute data based on the request behavior statistical information.

11. The method according to claim 1, wherein the community discovery processing performed on the homogeneous graph, the node sequence sampling performed on the homogeneous graph and the heterogeneous graph respectively, and the risk prediction processing performed on the attribute label, the graph association feature vector and the behavior feature corresponding to the first attribute data are implemented through a risk control detection model.

12. The method according to claim 11, wherein the method further comprises:

obtaining a risk control model file to be deployed;

identifying a model file format of the risk control model file and parsing the risk control model file based on the model file format to obtain a risk control detection model corresponding to the risk control model file;

allocating model version information to the risk control detection model in response to a version management operation initiated for the risk control detection model;

testing the risk control detection model in response to a deployment and launching operation initiated for the risk control detection model to obtain test service quality; and adding the risk control detection model and the model version information to a model base in response to the test service quality satisfying a model launching condition.

13. The method according to claim 12, wherein the testing the risk control detection model to obtain test service quality comprises:

obtaining off-line sample attribute data, wherein the off-line sample attribute data is labeled with a risk control label, and the risk control label is used for characterizing a risk of the off-line sample attribute data;

performing off-line prediction processing on the risk control detection model based on the off-line sample data to obtain an off-line prediction result; and evaluating the test service quality of the risk control detection model based on an error between the off-line prediction result and the risk control label.

14. The method according to claim 12, wherein the method further comprises:

determining a target user group associated with the risk control detection model in response to a traffic configuration operation for the risk control detection model, wherein the target user group comprises the target user, and the risk control detection model is used for responding to the service request initiated by the target user group;

generating a risk control strategy for the target user group through a decision engine in response to a risk control strategy configuration operation for the target user group, wherein the risk control strategy comprises a processing type field and an anti-fraud processing strategy associated with the processing type field; and mapping at least two risk prediction results of the risk control detection model with the processing type field; and the performing anti-fraud processing associated with the target risk prediction result on the service request comprises:

determining, through the decision engine, a processing type field having a mapping relationship with the target risk prediction result as a target processing type field; and performing the anti-fraud processing on the service request according to the anti-fraud processing strategy associated with the target processing type field.

15. The method according to claim 12, wherein the method further comprises:

recording a predicted risk prediction result obtained by the risk control detection model in response to the service request initiated by the target user group into a model execution log corresponding to the risk control detection model;

monitoring a risk status of the target user group, and determining an actual risk label of the target user group according to the risk status;

generating risk control strategy quality for the risk control detection model based on an error result between the actual risk label and the predicted risk prediction result in the model execution log; and generating a strategy adjustment prompt for the risk control detection model in response to the risk control strategy quality not satisfying a risk control condition, wherein the strategy adjustment prompt is used for prompting to adjust the anti-fraud processing strategy associated with the risk control detection model.

16. The method according to claim 1, further comprising:

in response to the target risk prediction result indicating the service request being an abnormal service request, delivering an abnormal prompt to the terminal device of the target user.

17. The method according to claim 1, further comprising:

concurrently obtaining a plurality of service requests from a plurality of terminal devices of users;

performing the real-time risk prediction processing for the plurality of service requests in parallel; and performing the real-time anti-fraud processing for the plurality of service requests in parallel.

18. The method according to claim 1, wherein a volume of data being processed in the real-time risk prediction processing and the real-time anti-fraud processing is equal to or greater than a magnitude of megabytes.

19. A data processing apparatus, comprising: a processor, and a memory, the memory being configured to store a program code, and the processor being configured to call the program code to execute:

obtaining a service request initiated by a terminal device of a target user;

obtaining first attribute data corresponding to the service request, obtaining a user social group of the target user, and respectively constructing a homogeneous graph and a heterogeneous graph by using the first attribute data and second attribute data of an associated user in the user social group as attribute nodes;

performing community discovery processing on the homogeneous graph to obtain an attribute label for the service request;

performing node sequence sampling on the homogeneous graph and the heterogeneous graph respectively, and generating a graph association feature vector of the attribute node corresponding to the first attribute data, comprising:

obtaining a homogeneous attribute node sequence from the homogeneous graph and obtaining a heterogeneous attribute node sequence from the heterogeneous graph;

inputting the homogeneous attribute node sequence into a homogeneous graph embedding layer of a risk control detection model as a training sample for training, to obtain a homogeneous graph feature vector of an attribute node corresponding to the first attribute data;

inputting the heterogeneous attribute node sequence into a heterogeneous graph embedding layer of the risk control detection model as a training sample for training, to obtain a heterogeneous graph feature vector of the attribute node corresponding to the first attribute data; and generating the graph association feature vector of the attribute node corresponding to the first attribute data based on the homogeneous graph feature vector and the heterogeneous graph feature vector;

performing real-time risk prediction processing on the attribute label, the graph association feature vector and a behavior feature corresponding to the first attribute data, to obtain a target risk prediction result; and performing real-time anti-fraud processing associated with the target risk prediction result on the service request, comprising:

in response to the target risk prediction result indicating the service request being an abnormal service request activity, rejecting to execute a service method associated with the service request, the abnormal service request comprising at least one of a click farming operation, fraud traffic, or operating a user account by simulating a fake terminal device.

20. A non-transitory computer-readable storage medium, storing a computer program, the computer program being configured to be loaded by a processor to execute:

obtaining a service request initiated by a terminal device of a target user;

obtaining first attribute data corresponding to the service request, obtaining a user social group of the target user, and respectively constructing a homogeneous graph and a heterogeneous graph by using the first attribute data and second attribute data of an associated user in the user social group as attribute nodes;

performing community discovery processing on the homogeneous graph to obtain an attribute label for the service request;

performing node sequence sampling on the homogeneous graph and the heterogeneous graph respectively, and generating a graph association feature vector of the attribute node corresponding to the first attribute data, comprising:

obtaining a homogeneous attribute node sequence from the homogeneous graph and obtaining a heterogeneous attribute node sequence from the heterogeneous graph;

inputting the homogeneous attribute node sequence into a homogeneous graph embedding layer of a risk control detection model as a training sample for training, to obtain a homogeneous graph feature vector of an attribute node corresponding to the first attribute data;

inputting the heterogeneous attribute node sequence into a heterogeneous graph embedding layer of the risk control detection model as a training sample for training, to obtain a heterogeneous graph feature vector of the attribute node corresponding to the first attribute data; and generating the graph association feature vector of the attribute node corresponding to the first attribute data based on the homogeneous graph feature vector and the heterogeneous graph feature vector;

performing real-time risk prediction processing on the attribute label, the graph association feature vector and a behavior feature corresponding to the first attribute data, to obtain a target risk prediction result; and performing real-time anti-fraud processing associated with the target risk prediction result on the service request, comprising:

in response to the target risk prediction result indicating the service request being an abnormal service request activity, rejecting to execute a service method associated with the service request, the abnormal service request comprising at least one of a click farming operation, fraud traffic, or operating a user account by simulating a fake terminal device.

* * * * *